United States Patent
Mine et al.

(10) Patent No.: US 9,696,645 B2
(45) Date of Patent: Jul. 4, 2017

(54) TONER FOR ELECTROSTATIC CHARGE IMAGE DEVELOPMENT

(71) Applicant: Konica Minolta, Inc., Tokyo (JP)

(72) Inventors: Tomoko Mine, Hino (JP); Kaori Matsushima, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/048,160

(22) Filed: Feb. 19, 2016

(65) Prior Publication Data

US 2016/0259258 A1 Sep. 8, 2016

(30) Foreign Application Priority Data

Mar. 2, 2015 (JP) ................................. 2015-040709

(51) Int. Cl.
| | |
|---|---|
| *C08G 63/02* | (2006.01) |
| *G03G 9/087* | (2006.01) |
| *C08F 257/02* | (2006.01) |
| *C08G 64/00* | (2006.01) |

(52) U.S. Cl.
CPC ....... *G03G 9/08786* (2013.01); *C08F 257/02* (2013.01); *G03G 9/08797* (2013.01)

(58) Field of Classification Search
CPC .................................................... G03G 9/087
USPC .......................... 524/174; 528/194, 193, 198
See application file for complete search history.

(56) References Cited

U.S. PATENT DOCUMENTS

| | | |
|---|---|---|
| 2014/0363763 A1 | 12/2014 | Shibata et al. |
| 2015/0153670 A1 | 6/2015 | Shimano et al. |
| 2016/0246198 A1* | 8/2016 | Fujisaki ............ G03G 9/08755 |

FOREIGN PATENT DOCUMENTS

| | | |
|---|---|---|
| JP | 2006251564 A | 9/2006 |
| JP | 2011197659 A | 10/2011 |
| JP | 2014235394 A | 12/2014 |
| JP | 2015-127806 A | 9/2015 |
| WO | 2006135041 A1 | 12/2006 |

OTHER PUBLICATIONS

Notification of Reasons of Refusal dated Sep. 20, 2016 from corresponding Japanese Application; Patent Application No. 2015-040709; English translation of Notification of Reasons of Refusal; Total of 11 pages.
Notification of Reasons for Refusal dated Jan. 17, 2017 from the corresponding Japanese Application No. 2015-040709; English translation of Notification of Reasons for Refusal: Total of 9 pages.

* cited by examiner

*Primary Examiner* — Terressa Boykin
(74) *Attorney, Agent, or Firm* — Lucas & Mercanti, LLP

(57) ABSTRACT

The present invention relates to a toner for electrostatic charge image development containing a binder resin, wherein the binder resin contains a hybrid crystalline polyester resin in which a crystalline polyester resin segment and a segment of an amorphous resin other than a polyester resin are chemically bonded, and an amorphous resin, the hybrid crystalline polyester resin and the amorphous resin having a specific phase-separated structure; and the hybrid crystalline polyester resin is a graft-copolymer having a specific structure, the toner having the specific thermal properties. According to the present invention, a means capable of providing an excellent low temperature fixability even to uneven media, and of improving both of image storability and heat-resistant can be provided.

8 Claims, No Drawings

TONER FOR ELECTROSTATIC CHARGE IMAGE DEVELOPMENT

CROSS-REFERENCE TO RELATED APPLICATION

This application is based on Japanese Patent Application No. 2015-040709 filed on Mar. 2, 2015, the contents of which are incorporated herein by reference.

BACKGROUND

1. Technical Field

The present invention relates to a toner for electrostatic charge image development.

2. Description of Related Arts

It has recently been required to reduce heat energy at the time when a toner image is fixed, for the purpose of acceleration of a printing speed, reduction of environmental burden, or the like.

In order to reduce the heat energy at the time when the toner image is fixed, as described above, a technique capable of improving a low temperature fixability of a toner is required. One of methods for achieving is a method in which a crystalline resin such as crystalline polyester having excellent sharp meltability is used as a binder resin.

For example, JP-A-2006-251564 (corresponds to US 2006/204880 A1) proposes a toner for electrostatic charge image development which includes a binder resin containing a crystalline polyester resin and an amorphous resin. When the combination of the crystalline polyester resin and the amorphous resin is used as above, parts of crystals melt at a temperature over a melting point of the crystalline polyester resin in a temperature history on fixing to compatibilize the crystalline polyester resin with the amorphous resin; as a result, fixation can be attained at a lower temperature. According to JP-A-2006-251564 (corresponds to US 2006/204880 A1), it is also possible to cause the fixation at a temperature lower than that in conventional techniques by controlling thermal properties of the crystalline polyester resin and the amorphous resin contained in the binder resin to specific ranges.

WO 2006/135041 (corresponds to US 2009/068578 A1) and JP-A-2011-197659 (corresponds to US 2011/212398 A1) also disclose techniques using a crystalline resin such as a crystalline polyester as a binder resin. WO 2006/135041 (corresponds to US-A-2009/068578) proposes a binder resin for a toner, containing a hybrid resin, which is a copolymer of a crystalline polyester resin and an amorphous resin, and an amorphous resin. The binder resin for the toner described above has a phase-separated structure (sea-island structure) wherein the hybrid resin forms a matrix and the amorphous resin forms domains, which is excellent in the low temperature fixability. JP-A-2011-197659 (corresponds to US 2011/212398 A1) discloses a toner which is rendered to be fixed at a lower temperature by the introduction of a crystalline polyester resin to a binder resin containing a vinyl-based resin.

SUMMARY

According to the techniques disclosed in JP-A-2006-251564 (corresponds to US 2006/204880 A1), WO 2006/135041 (corresponds to US 2009/068578 A1) and JP-A-2011-197659 (corresponds to US 2011/212398 A1) described above, toners having good low temperature fixability can be obtained. However, in a circumstance wherein printed matter has recently become more diverse and the low temperature fixability to uneven media (a substrate to be printed) such as embossed paper is also required, the technique disclosed in JP-A-2006-251564 (corresponds to US 2006/204880 A1) or WO 2006/135041 (corresponds to US 2009/068578 A1) may not sometimes provide the sufficient low temperature fixability.

In the technique for forming an image using a toner, it is further required to improve not only the low temperature fixability but also various properties including an image storability and a heat-resistant storage property in a well-balanced way. The technique disclosed in JP-A-2006-251564 (corresponds to US 2006/204880 A1), WO 2006/135041 (corresponds to US 2009/068578 A1), or JP-A-2011-197659 (corresponds to US 2011/212398 A1) cannot satisfy all of the properties described above in a well-balanced way.

The present invention aims at providing a method which provides an excellent low temperature fixability even to uneven media such as embossed paper, and improves both of an image storability and a heat-resistant storage property.

The present inventors have intensively studied. As a result, they have found that when a binder resin, which contains a hybrid crystalline polyester resin in which crystalline polyester resin unit and an amorphous resin unit other than a polyester resin are grafted in a specific form, and an amorphous resin, and has a specific phase-separated structure is used, and thermal properties are adjusted to specific ranges, then the problems can be resolved; and have completed the present invention.

The problems described above can be solved by a toner for electrostatic charge image development containing a binder resin, wherein the binder resin contains a hybrid crystalline polyester resin in which a crystalline polyester resin unit and an amorphous resin unit other than a polyester resin are chemically bonded, and an amorphous resin, and has a phase-separated structure in which the hybrid crystalline polyester resin forming a dispersion phase and the amorphous resin forming a continuous phase; and the hybrid crystalline polyester resin is a graft-copolymer having a main chain formed of the amorphous resin unit other than a polyester resin and a side chain formed of the crystalline polyester resin unit, the toner satisfying the relationships represented by the following formulas (1) and (2):

[Math. 1]

$$0.15 < \Delta H2/\Delta H1 \leq 0.95 \tag{1}$$

$$55 \leq Tm1 \leq 80 \tag{2}$$

wherein Tm1 (° C.) is the temperature derived from an endothermic peak of the hybrid crystalline polyester resin in the first heating process in a differential scanning calorimetry of the toner; $\Delta H1$ (J/g) is the amount of endothermic heat based on the endothermic peak; and $\Delta H2$ (J/g) is the amount of endothermic heat based on the endothermic peak in the second heating process.

Embodiments of the present invention are explained below. The present invention is not limited to only the following embodiments. As used herein, "X to Y" indicating a range means "X or more and Y or less". Operations are made or physical properties are measured in conditions of a room temperature (20 to 25° C.) and a relative humidity of 40 to 50% RH unless otherwise specified.

An embodiment of the present invention is "a toner for electrostatic charge image development containing a binder resin, wherein the binder resin contains a hybrid crystalline polyester resin in which a crystalline polyester resin unit and an amorphous resin unit other than a polyester resin are chemically bonded, and an amorphous resin, and has a phase-separated structure in which the hybrid crystalline polyester resin forming a dispersion phase and the amorphous resin forming a continuous phase; and the hybrid crystalline polyester resin is a graft-copolymer having a main chain formed of the amorphous resin unit other than a polyester resin and a side chain formed of the crystalline polyester resin unit, the toner satisfying the relationships represented by the above formulas (1) and (2), wherein Tm1 (° C.) is the temperature derived from an endothermic peak of the hybrid crystalline polyester resin in the first heating process in a differential scanning calorimetry of the toner; ΔH1 (J/g) is the amount of endothermic heat based on the endothermic peak; and ΔH2 (J/g) is the amount of endothermic heat based on the endothermic peak in the second heating process".

In the present invention, the term "toner for electrostatic charge image development" may sometimes be referred to simply as "toner". In addition, in the present invention, the term "hybrid crystalline polyester resin" may sometimes be referred to simply as "hybrid resin".

In the toner according to the present invention, as described above, the binder resin, forming the toner, contains the hybrid resin which is a graft-copolymer having a specific form, and the amorphous resin. And these resins form a specific phase-separated structure. In addition, the toner of the present invention has specific thermal properties.

As described above, the crystalline polyester resin is effective in improving the low temperature fixability of the toner. More specifically, when the mixture of the crystalline polyester resin and the amorphous resin is used, the parts of the crystals melt at a temperature over a melting point of the crystalline polyester resin to compatibilize with the amorphous resin. As a result, fixation can be attained at a lower temperature. When the crystalline polyester resin and the amorphous resin are combined, however, the image storability and the heat-resistant storage property of the toner may sometimes be deteriorated due to the plasticization of the toner. In contrast, when the compatibility of the crystalline polyester resin to the amorphous resin is controlled to an adequate range, the low temperature fixability, the image storability, and the heat-resistant storage property can be improved in a well-balanced way.

On the other hand, in the recent tendency of diversity of printed matter, it has been required to have the low temperature fixability for uneven media also, including embossed paper. A low temperature fixability required for such uneven media is stricter than that in a case of plain paper. The technique disclosed in JP-A-2006-251564 (corresponds to US 2006/204880 A1), WO 2006/135041 (corresponds to US 2009/068578 A1), and JP-A-2011-197659 (corresponds to US 2011/212398 A1), however, cannot sufficiently satisfy the strict requirements.

As a result of the present inventors' intensive study, they have, surprisingly, found that when the binder resin, containing the hybrid resin, which is the graft-copolymer having a specific form, and the amorphous resin, is used, a toner capable of showing an excellent low temperature fixability even to the uneven media can be obtained; and have completed the present invention.

As described above, the hybrid resin contained in the binder resin, which is contained in the toner of the present invention, is a graft-copolymer, which has a unit of an amorphous resin other than a polyester resin (hereinafter, which may sometimes be referred to simply as "amorphous resin unit") as a main chain, and a crystalline polyester resin unit as a side chain. The hybrid resin used in the present invention, accordingly, is a graft-copolymer having a comb structure in which the amorphous resin unit forms a trunk and the crystalline polyester resin units form branches. Herein, "a unit" can be used for the same meaning as "a segment".

The crystalline polyester resin units have a tendency in which the crystalline polyester resin units easily cause intermolecular cohesion between them, because there is a high affinity between the same kinds of resins. In the toner of the present invention, the orientation of the crystalline polyester resin units may be easily aligned, and the crystalline polyester resin units may be densely oriented by employing the comb structure as described above. As the cohesion of the crystalline polyester resin units are, accordingly, further promoted, the degree of crystallinity of the binder resin in the toner is increased (the binder resin in the toner is easily crystallized). As a result, the toner according to the present invention has an excellent sharp meltability, and can suppress cold offset even to the uneven media such as embossed paper and shows the excellent low temperature fixability.

In addition, the toner of the present invention satisfies the relationships of the formulas (1) and (2) described above. Here, in the formula (1), a case where ΔH2/ΔH1 is large indicates the compatibility between the hybrid resin and the amorphous resin is suppressed when the toner is heated and fixed; whereas a case where the value described above is small indicates the hybrid resin and the amorphous resin easily compatibilize with each other. Accordingly, when the value of ΔH2/ΔH1 is more than 0.15 and 0.95 or less as in the formula (1), the compatibility between the hybrid resin and the amorphous resin is appropriately controlled. The binder resin whose compatibility is adequately controlled as above can suppress the reduction of the image storability and the heat-resistant storage property due to too much plasticization.

The formula (2) indicates that the melting point of the hybrid resin is within the range of 55 to 80° C. The toner of the present invention, which satisfies the formula (2), can sufficiently soften when it is heated and fixed, and contributes to further improvement of the low temperature fixability.

According to the present invention, therefore, a means capable of providing the excellent low temperature fixability to uneven media such as embossed paper, and of improving both of the image storability and the heat-resistant storage property can be provided.

In addition, the binder resin contained in the toner of the present invention has a phase-separated structure in which the hybrid resin forms the dispersion phase (domain) and the amorphous resin forms the continuous phase (matrix), and thus the exposure of the crystalline polyester resin unit to the surface of the toner is suppressed. Such a structure can lead to less occurrence of plasticization of a resin of the surface of the toner particle, and can suppress the cohesion between particles, when a temperature inside a printer is elevated; in other words, the heat-resistant storage property is better, and thus it is less likely to cause defective image due to aggregates of particles.

In addition, deterioration of an electrification property of the toner, caused by exposure of the crystalline polyester resin unit onto the toner surface, can be suppressed, and it can be presumed that there is also an effect of improving a charging uniformity.

The mechanisms described above are based on the presumptions, and the present invention is not limited to the mechanisms described above.

The present invention is explained in detail below.

The toner for electrostatic charge image development (toner) according to the present invention contains essentially the binder resin, which contains a hybrid crystalline polyester resin (a hybrid resin) and an amorphous resin, which are explained in detail below. The toner of the present invention satisfies the formulas (1) and (2). The definitions in the formulas (1) and (2) are as follows:

$Tm1$ (° C.): the temperature of an endothermic peak derived from the hybrid crystalline polyester resin in the first heating process in a differential scanning calorimetry (DSC);

$\Delta H1$ (J/g): the amount of endothermic heat based on the above-mentioned endothermic peak;

$\Delta H2$ (J/g): the amount of endothermic heat based on the endothermic peak derived from the hybrid crystalline polyester resin in the second heating process.

Although the definitions of $Tm1$, $\Delta H1$ and $\Delta H2$ are as described above, more specifically, values measured according to a method described in Example below are adopted.

The value of $\Delta H2/\Delta H1$ shown in the formula (1) is more than 0.15 and 0.95 or less. The toner satisfying such a relationship is in a state where the compatibility between the hybrid resin and the amorphous resin, contained in the binder resin, is appropriately controlled. The good image storability can be kept without plasticization even after the heating and fixation.

The value of $\Delta H2/\Delta H1$ is preferably 0.40 or more, more preferably 0.50 or more, particularly preferably 0.70 or more, in terms of the suppression of the compatibility between the hybrid resin and the amorphous resin, and the improvement of the image storability. On the other hand, the value of $\Delta H2/\Delta H1$ is preferably 0.90 or less, more preferably 0.88 or less, in order to ensure the low temperature fixability. The value is, accordingly, preferably $0.40 \leq \Delta H2/\Delta H1 \leq 0.90$. In addition, it is more preferable that $\Delta H1$ and $\Delta H2$ satisfy the following formula (3); it is even more preferable that $\Delta H1$ and $\Delta H2$ satisfy the following formula (4); and it is particularly preferable that they satisfy a relationship of $0.70 \leq \Delta H2/\Delta H1 \leq 0.88$.

[Math. 2]

$$0.50 \leq \Delta H2/\Delta H1 \leq 0.90 \quad (3)$$

[Math. 3]

$$0.70 \leq \Delta H2/\Delta H1 \leq 0.90 \quad (4)$$

The value of $Tm1$ shown in the formula (2) is a melting point of the hybrid resin, and when the melting point is within the range of the formula (2), the toner can be sufficiently softened and the sufficient low temperature fixability can be ensured. $Tm1$ is more preferably $60 \leq Tm1 \leq 78$, even more preferably $65 \leq Tm1 \leq 78$, and particularly preferably $75 \leq Tm1 \leq 78$, in order to improve the various properties in a well-balanced way.

<Binder Resin>

The binder resin, forming the toner according to the present invention, a hybrid crystalline polyester resin (the hybrid resin) and an amorphous resin, which are explained in detail below. The binder resin has the phase-separated structure in which the hybrid resin forms the dispersion phase (the domain), and the amorphous resin forms the continuous phase (the matrix). It can be confirmed that the binder resin has the specific phase-separated structure as described above, for example, by coloring the toner with osmium tetraoxide or the like if necessary, and then observing it with a scanning electron microscope (SEM), a transmission electron microscope (TEM), or the like.

As the binder resin has such a specific phase-separated structure, it has an advantage in which the cohesion of the toner particles in a printer can be suppressed. Preferably, the charging uniformity can also be improved as described above.

The formation of the specific phase-separated structure depends on the molecular structure and the content of the hybrid resin and the amorphous resin. In order to form the specific phase-separated structure, accordingly, the content of the hybrid resin which forms the binder resin, is preferably adjusted to 3% by mass or more and less than 60% by mass relative to the total amount of the binder resin. In addition when the content is within the range described above, effects of improving various physical properties because of the addition of the hybrid resin are easily obtained. In particular, the content is more preferably 5% by mass or more and less than 30% by mass, even more preferably 8% by mass or more and less than 20% by mass, in terms of the further improvement of the low temperature fixability and the image storability. A method described, for example, in JP-B2-3869968 (a method using a Soxhlet extraction apparatus) can be employed as a method of isolating and extracting the hybrid resin from the toner, and a content of each resin can be specified according to this method.

On the other hand, the amorphous resin, contained in the binder resin, is preferably contained in a content of more than 40% by mass and 97% by mass or less relative to the total amount of the binder resin. The content of the amorphous resin is more preferably more than 70% by mass and 95% by mass or less, relative to the total amount of the binder resin, even more preferably more than 80% by mass and 92% by mass or less. As the resins contained in the binder resin, resins other than the hybrid resin and the amorphous resin may be included, but the binder resin consisting of the hybrid resin and the amorphous resin is preferable. Each of the hybrid resin and the amorphous resin is explained below.

(Hybrid Crystalline Polyester Resin (Hybrid Resin))

The hybrid crystalline polyester resin (the hybrid resin) is a resin in which a crystalline polyester resin unit is chemically bonded to an amorphous resin unit of other than the polyester resin.

The crystalline polyester resin unit, in the description above, refers to a unit derived from a crystalline polyester resin; in other words, which refers to a molecular chain having the same chemical structure as that forming a crystalline polyester resin. The amorphous resin unit other than a polyester resin refers to a unit derived from an amorphous resin other than a polyester resin; in other words, which refers to a molecular chain having the same chemical structure as that forming an amorphous resin other than a polyester resin.

The hybrid resin, contained in the binder resin, contains an amorphous resin unit other than a polyester resin as well as a crystalline polyester resin unit, which is a graft-copolymer having a specific form. Specifically, the hybrid resin is a graft-copolymer whose main chain is an amorphous resin unit other than a polyester resin and whose side chain is a crystalline polyester resin unit.

In the graft-copolymer having such a form, the orientation of the crystalline polyester resin unit can easily be aligned in one direction, and the crystalline polyester resin units can easily be oriented densely, and thus the sufficient crystallinity can be provided to the hybrid resin. As a result, the binder resin in the toner is easily crystallized. Accordingly, the toner according to the present invention has the excellent sharp meltability, can suppress the cold offset even to the uneven media such as embossed paper, and shows the excellent low temperature fixability. By using the graft-copolymer having the form described above, $\Delta H1$ and $\Delta H2$ are easily controlled.

The hybrid resin has a weight average molecular weight (Mw) of preferably 5,000 to 100,000, more preferably 7,000 to 50,000, particularly preferably 8,000 to 20,000, in order to securely obtain both of the sufficient low temperature fixability and the excellent long term heat-resistant storage stability.

Substituents such as a sulfonate group, a carboxyl group and a urethane group may be introduced into the hybrid resin contained in the binder resin. The substituent may be introduced into the crystalline polyester resin unit or into the amorphous resin unit other than the polyester resin.

<<Crystalline Polyester Resin Unit>>

The crystalline polyester resin unit is a unit derived from a known polyester resin obtained by a polycondensation reaction of a di- or more-valent carboxylic acid (polyvalent carboxylic acid) and a di- or more-hydric alcohol (polyhydric alcohol), and is a resin unit having a clear endothermic peak, which is not a step-wise endothermic change, in a differential scanning calorimetry (DSC) of the toner. Specifically, the clear endothermic peak means a peak whose a half-value width of the endothermic peak is 15° C. or less, when measurement is performed at a temperature rising speed of 10° C./minute in a differential scanning calorimetry (DSC) described in Examples.

The crystalline polyester resin unit is not particularly limited so long as it is as defined above. As long as a toner containing a resin shows the clear endothermic peak as described above, for example, the resin having a structure in which a main chain formed of a crystalline polyester resin unit is copolymerized with another component and the resin having a structure in which a main chain formed of another component is copolymerized with a crystalline polyester resin unit, correspond to the hybrid resin having a crystalline polyester resin unit as referred in the present invention.

The crystalline polyester resin unit can be produced from a polyvalent carboxylic acid component and a polyhydric alcohol component. At that time, it is preferable that the number of carbon atoms C (acid) of a polyvalent carboxylic acid which forms a crystalline polyester resin unit, and the number of carbon atoms C (alcohol) in a polyhydric alcohol which forms a crystalline polyester resin unit, satisfy the relationships of following formulas (5) to (7).

[Math. 4]

$$4 \geq |C(\text{acid}) - C(\text{alcohol})| \geq 0 \quad (5)$$

$$16 \geq C(\text{acid}) \geq 4 \quad (6)$$

$$16 \geq C(\text{alcohol}) \geq 4 \quad (7)$$

When the polyvalent carboxylic acid and the polyhydric alcohol which satisfy the formulas described above are used, $\Delta H1$, $\Delta H2$ and $Tm1$ are easily controlled so as to satisfy the formulas (1) and (2) described above.

When the formula (5) is satisfied, the regularity of the molecular chain of the crystalline polyester resin unit rises, and the crystallinity would become higher. When the formulas (6) and (7) are satisfied, the interaction between different molecules in the crystalline polyester resin unit would be increased, and the crystallinity would become higher. As a result, the low temperature fixability can further be improved.

When two or more kinds of the polyvalent carboxylic acid components are contained, the above-mentioned C (acid) is defined as the number of carbon atoms of a polyvalent carboxylic acid component whose content is the highest. When the amounts are the same, the C (acid) is the number of carbon atoms of a polyvalent carboxylic acid component whose number of carbon atoms is the largest.

Similarly, when two or more kinds of the polyhydric alcohol components are contained, the above-mentioned C (alcohol) is defined as the number of carbon atoms of a polyhydric alcohol component whose content is the highest. When the amounts are the same, C (alcohol) is the number of carbon atoms of a polyvalent carboxylic acid component in whose number of carbon atoms is the largest.

The valency of the polyvalent carboxylic acid component or the polyhydric alcohol component is preferably from 2 to 3 respectively, particularly preferably 2. Thus, particularly preferable embodiments in which the valency thereof is 2 (i.e., a dicarboxylic acid component and a diol component) are explained.

As the dicarboxylic acid component, it is preferable to use an aliphatic dicarboxylic acid, and it is also possible to use an aromatic dicarboxylic acid together with an aliphatic dicarboxylic acid. It is preferable to use a linear aliphatic dicarboxylic acid as the aliphatic dicarboxylic acid. When the linear one is used, the crystallinity is advantageously improved. The dicarboxylic acid component may be used alone or as a mixture of two or more kinds.

The aliphatic dicarboxylic acid may include, for example, oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecane diacid), 1,11-undecanedicarboxylic acid, 1,12-dodecanedicarboxylic acid (tetradecane diacid), 1,13-tridecanedicarboxylic acid, 1,14-tetradecanedicarboxylic acid, 1,16-hexadecanedicarboxylic acid, 1, 18-octadecanedicarboxylic acid, and the like. Lower alkyl esters and acid anhydrides thereof may also be used.

Of the aliphatic dicarboxylic acids described above, aliphatic dicarboxylic acids satisfying the formula (6) are preferable, and aliphatic dicarboxylic acids having 6 to 14 carbon atoms are more preferable, because the effects of the present invention can easily be obtained as described above.

The aromatic dicarboxylic acid, which can be used together with the aliphatic dicarboxylic acid, may include, for example, terephthalic acid, isophthalic acid, orthophthalic acid, t-butylisophthalic acid, 2,6-naphthalenedicarboxylic acid, 4,4'-biphenyldicarboxylic acid, and the like. Of these, it is preferable to use terephthalic acid, isophthalic acid, or t-butylisophthalic acid, in terms of the easiness of acquisition and the easiness of emulsification.

In the dicarboxylic acid component for forming a crystalline polyester resin unit, the content of the aliphatic dicarboxylic acid is preferably 50% by construction mole or more, more preferably 70% by construction mole or more, even more preferably 80% by construction mole or more, particularly preferably 100% by construction mole. When the content of the aliphatic dicarboxylic acid in the dicarboxylic acid component is adjusted to 50% by construction mole or more, the crystallinity of the crystalline polyester resin unit can be sufficiently ensured.

It is preferable to use an aliphatic diol as the diol component, and diols other than the aliphatic diol may be contained if necessary. It is preferable to use a linear aliphatic diol as the aliphatic diol. When the linear one is used, the crystallinity is advantageously improved. The diol component may be used alone or as a mixture of two or more kinds.

The aliphatic diol may include, for example, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol, and the like.

Of the aliphatic diols as the diol component, aliphatic diols having 2 to 16 carbon atoms are preferable, aliphatic diol satisfying the formula (7), i.e., aliphatic diol having 4 to 16 carbon atoms are more preferable, and aliphatic diol having 6 to 12 carbon atoms are particularly preferable, because the effects of the present invention can easily be obtained as described above.

Diols other than the aliphatic diol, which are used if necessary, may include diols having a double bond, diols having a sulfonate group, and the like. Specifically, the diol having a double bond may include, for example, 2-butene-1,4-diol, 3-butene-1,6-diol, 4-butene-1,8-diol, and the like.

In the diol component for forming a crystalline polyester resin unit, the content of the aliphatic diol is preferably 50% by construction mole or more, more preferably 70% by construction mole or more, even more preferably 80% by construction mole or more, particularly preferably 100% by construction mole. When the content of the aliphatic diol in the diol component is adjusted to 50% by construction mole or more, the crystallinity of the crystalline polyester resin unit can be ensured, the produced toner shows the excellent low temperature fixability, and a finally formed image has good glossiness.

As for a use ratio of the diol component and the dicarboxylic acid component, an equivalent ratio [OH]/[COOH], in which [OH] is an equivalence of hydroxyl groups in the diol component, and [COOH] is an equivalence of carboxyl groups in the dicarboxylic acid component, is preferably from 1.5/1 to 1/1.5, more preferably from 1.2/1 to 1/1.2. When the use ratio of the diol component and the dicarboxylic acid component is within the range described above, $\Delta H1$, $\Delta H2$ and $Tm1$ are easily controlled so as to satisfy the relationships of the formulas (1) and (2).

The method for forming the crystalline polyester resin unit is not particularly limited, and the unit can be formed by polycondensation (esterification) of a polyvalent carboxylic acid and a polyhydric alcohol using a known esterification catalyst.

The catalyst which can be used in the production of the crystalline polyester resin unit may include compounds of an alkali metal such as sodium or lithium; compounds including a Group 2 element such as magnesium or calcium; compounds of a metal such as aluminum, zinc, manganese, antimony, titanium, tin, zirconium, or germanium; phosphorous acid compounds; phosphoric acid compounds; amine compounds, and the like. Specifically, the tin compound may include dibutyltinoxide, tin octylate, tin dioctylate, and salts thereof. The titanium compound may include titanium alkoxides such as tetranormalbutyl titanate, tetraisopropyl titanate, tetramethyl titanate, and tetrastearyl titanate; titanium acylates such as polyhydroxytitanium stearate; titanium chelates such as titanium tetraacetylacetonate, titanium lactate, and titanium triethanolaminate, and the like. The germanium compound may include germanium dioxide, and the like. The aluminum compound may include oxides such as polyaluminium hydroxide, aluminum alkoxide, tributyl aluminate, and the like. They may be used alone or as a mixture of two or more kinds.

The polymerization temperature is not particularly limited, and it is preferably from 150 to 250° C. The polymerization time is not particularly limited, and it is preferably from 0.5 to 10 hours. During the polymerization, the reaction system may be set under a reduced pressure if necessary.

The content of a crystalline polyester resin unit is preferably more than 65% by mass and 95% by mass or less, relative to the total amount of the hybrid resin, more preferably more than 70% by mass and 90% by mass or less, even more preferably more than 75% by mass and 85% by mass or less. When the content is within the range described above, the sufficient crystallinity can be imparted to the hybrid resin. The content of each unit in the hybrid resin can be specified by, for example, NMR measurement or methylation reaction P-GC/MS measurement.

<<Amorphous Resin Unit Other than Polyester Resin>>

The amorphous resin unit other than the polyester resin is an essential unit for controlling the affinity between the amorphous resin and the hybrid resin, which form the binder resin. When the amorphous resin unit is present, the affinity between the hybrid resin and the amorphous resin is improved, and thus the compatibility between the hybrid resin and the amorphous resin is easily controlled.

The amorphous resin unit is a unit derived from an amorphous resin other than a crystalline polyester resin. It can be confirmed that an amorphous resin unit is contained in a hybrid resin (or in the toner) by, for example, specifying a chemical structure using NMR measurement or methylation reaction P-GC/MS measurement.

The amorphous resin unit is a resin unit having no melting point and a comparatively high glass transition temperature (Tg) if a resin having the same chemical structure and molecular weight as the unit is subjected to a differential scanning calorimetry (DSC). At this time, as for the resin having the same chemical structure and molecular weight of the unit, it is preferable that a glass transition temperature (Tg1) in the first heating process in the DSC measurement is preferably from 30 to 80° C., particularly preferably from 40 to 65° C. The glass transition temperature (Tg1) can be measured in a method described in Examples.

The amorphous resin unit is not particularly limited, so long as it is as defined above. For example, As long as a toner contains a resin having an amorphous resin unit as described above, for example, the resin having a structure in which a main chain formed of an amorphous resin unit is copolymerized with another component, and the resin having a structure in which a main chain formed of another component is copolymerized with an amorphous resin unit, correspond to the hybrid resin having an amorphous resin unit as referred in the present invention.

The content of an amorphous resin unit is preferably 5% by mass or more and less than 35% by mass, relative to the total amount of the hybrid resin, more preferably 10% by mass or more and less than 30% by mass, even more preferably 15% by mass or more and less than 25% by mass. When the content is within the range described above, the sufficient crystallinity can be imparted to the hybrid resin, and the binder resin capable of satisfying the formula (1) can be obtained. $\Delta H1$ and $\Delta H2$ depend on the contents of the hybrid resin and the amorphous resin in the binder resin, the chemical structures of the crystalline polyester resin unit and the amorphous resin unit, and the like. In particular, when the content of the amorphous resin unit in the hybrid resin is adjusted to the range described above, a binder resin for satisfying the formula (1) and further satisfying the above-mentioned preferably value of ΔH2/ΔH1 can easily be obtained.

It is preferable that the amorphous resin unit is formed of the same kind of resin as the amorphous resin (i.e., resin other than the hybrid resin) contained in the binder resin. When it is in such a form, the affinity between the hybrid resin and the amorphous resin is further improved, and the hybrid resin is easily taken into the amorphous resin, and thus the compatibility is easily controlled and the values of ΔH1 and ΔH2 are easily controlled.

Here, "the same kind of resin" means that a characteristic chemical bond is commonly contained in repeating units, wherein "characteristic chemical bond" follows "Polymer Classification" described in National Institute for Materials Science (NIMS) Materials Database (http://polymer.nims.go.jp/PoLyInfo/guide/jp/term_polymer.html). The "characteristic chemical bond" refers to a chemical bond forming a polymer classified by 22 polymers including polyacryl, polyamide, polyanhydride, polycarbonate, polydiene, polyester, polyhaloolefin, polyimide, polyimine, polyketone, polyolefin, polyether, polyphenylene, polyphosphazen, polysiloxane, polystyrene, polysulfide, polysulfone, polyurethane, polyurea, polyvinyl, and other polymers.

In a case where the resin is a copolymer, "the same kind of resin" refers to resins having a common characteristic chemical bond, when monomers having the chemical bond are structural units in a chemical structure of multiple monomers forming the copolymer. Even if the resins show a different property from each other, or even if the resins have a different molar component ratio of monomers forming the copolymer from each other, if they have a common characteristic chemical bond, then they are considered to be the same resins.

For example, a resin (or a resin unit) formed of styrene, butyl acrylate and acrylic acid and a resin (or a resin unit) formed of styrene, butyl acrylate and methacrylic acid have both at least chemical bond forming polyacrylic moiety, and thus they are the same resin. Furthermore, a resin (a resin unit) formed of styrene, butyl acrylate and acrylic acid and a resin (a resin unit) formed of styrene, butyl acrylate, acrylic acid, terephthalic acid, and fumaric acid are both have at least a chemical bond forming an polyacrylic moiety as a common chemical bond, and thus they are the same resin.

The resin component forming the amorphous resin unit is not particularly limited, and may include, for example, a vinyl resin unit, a urethane resin unit, a urea resin unit, and the like. Of these, the vinyl resin unit and the urea resin unit are preferable, because the thermoplastic property can easily be controlled, and the vinyl resin unit is particularly preferable.

Vinyl Resin Unit

The vinyl resin unit is not particularly limited, so long as it is obtained by polymerization of a vinyl compound. It may include, for example, an acrylic ester resin unit, a styrene-acrylic ester resin unit, an ethylene-vinyl acetate resin unit, and the like. They may be used alone or as a mixture of two or more kinds.

Of the vinyl resin units described above, the styrene-acrylic ester resin unit (styrene-acrylic resin unit) is preferable, considering the plasticity upon the heat fixation. The following explanation, accordingly, is made about styrene-acrylic resin unit as the amorphous resin unit.

The styrene-acrylic resin unit is formed by an addition polymerization of at least a styrene monomer and a (meth)acrylic ester monomer. The styrene monomer, herein, includes compounds having a known side chain or a known functional group in a styrene structure, in addition to styrene represented by a structural formula: $CH_2\!\!=\!\!CH\!\!-\!\!C_6H_5$. The (meth)acrylic ester monomer herein includes ester compounds having a known side chain or a known functional group in structure of an acrylic ester derivative or a methacrylic ester derivative, in addition to acrylic ester compounds, represented by $CH_2\!\!=\!\!CHCOOR$ (wherein R is an alkyl group), and methacrylic ester compound.

Specific examples of the styrene monomer and the (meth)acrylic ester monomer, from which the styrene-acrylic resin unit can be formed, are shown below, but monomers which can be used for forming the styrene-acrylic resin unit used in the present invention are not limited thereto.

First, the styrene monomer may specifically include, for example, styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, p-n-dodecylstyrene, and the like. The styrene monomers may be used alone or as a mixture of two or more kinds.

The (meth)acrylic ester monomer may specifically include, for example, acrylic ester monomers such as methyl acrylate, ethylacrylate, isopropylacrylate, n-butylacrylate, t-butyl acrylate, isobutyl acrylate, n-octyl acrylate, 2-ethylhexyl acrylate, stearyl acrylate, lauryl acrylate, and phenyl acrylate; methacrylic ester monomers such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate, and the like.

The term "(meth)acrylic ester monomer" used herein is a general term of the "acrylic ester monomer" and the "methacrylic ester monomer". For example, "methyl (meth)acrylate" is a general term of "methyl acrylate" and "methyl methacrylate."

The acrylic ester monomers or the methacrylic ester monomers may be used alone or as a mixture of two or more kinds. In order to form a copolymer, accordingly, it is possible to use a styrene monomer and two or more kinds of acrylic ester monomers, to use a styrene monomer and two or more kinds of methacrylic ester monomers, or to use a styrene monomer, an acrylic ester monomer, and a methacrylic ester monomer.

The content of the structural units derived from a styrene monomer in an amorphous resin unit is preferably from 40 to 90% by mass, relative to the total amount of the amorphous resin unit. The content of structural units derived from the (meth)acrylic ester monomer in an amorphous resin unit is preferably from 10 to 60% by mass relative to the total amount of the amorphous resin unit. When the contents are within the ranges described above, the plasticity of the hybrid resin is easily controlled.

It is preferable that the amorphous resin unit is formed by addition polymerization with a compound capable of chemically bonding to the crystalline polyester resin unit, in addition to the styrene monomer and the (meth)acrylic ester monomer. Specifically, it is preferable to use a compound capable of bonding to the hydroxyl group [—OH] derived from the polyhydric alcohol, or the carboxyl group [—COOH] derived from the polyvalent carboxylic acid, which are contained in the crystalline polyester resin unit, through an ester linkage. The amorphous resin unit, accordingly, is preferably formed by copolymerization with a compound which is addition polymerizable with the styrene monomer and the (meth)acrylic ester monomer and which has the carboxyl group [—COOH] or the hydroxyl group [—OH].

Such a compound may include, for example, compounds having a carboxyl group such as acrylic acid, methacrylic acid, maleic acid, itaconic acid, cinnamic acid, fumaric acid, maleic monoalkyl esters, and itaconic acid monoalkyl esters; compounds having a hydroxyl group such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and polyethylene glycol mono(meth)acrylate.

The content of the structural units derived from the compound described above in an amorphous resin unit is preferably from 0.5 to 20% by mass relative to the total amount of the amorphous resin unit.

The method for forming the styrene-acrylic resin unit is not particularly limited, and it is exemplified by a method in which monomers are polymerized using a known oil-soluble or water-soluble polymerization initiator. The oil-soluble polymerization initiator may specifically include the following azo-based or diazo-based polymerization initiator and peroxide-based polymerization initiator.

The azo-based or diazo-based polymerization initiator may include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

The peroxide-based polymerization initiator may include benzoyl peroxide, methylethylketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, tris-(t-butylperoxy)triazine, and the like.

In a case where resin particles (toner base particles) are formed by an emulsion polymerization, it is possible to use a water-soluble radial polymerization initiator. The water-soluble polymerization initiator may include persulfates such as potassium persulfate and ammonium persulfate; azobisamino dipropane acetate, azobiscyano valeric acid and salts thereof, hydrogen peroxide, and the like.

Urea Resin Unit

The urea resin unit is not particularly limited so long as it is obtained by reaction of an isocyanate component with an amine component. The urea resin units obtained by reaction of an isocyanate-modified amorphous resin having an isocyanate group with an amino-modified amorphous resin having an amino group are preferable. As the isocyanate-modified amorphous resin and the amino-modified amorphous resin, an isocyanate-modified amorphous polyester resin (which hereinafter may sometimes be referred to as "isocyanate-modified polyester resin") and an amino-modified amorphous polyester resin (which hereinafter may sometimes be referred to as "amino-modified polyester resin") are preferable respectively. They may be used alone or as a mixture of two or more kinds.

The isocyanate-modified polyester resin is obtained by polycondensation reaction of a polyvalent carboxylic acid with a polyhydric alcohol, and further reaction (modification reaction with isocyanate) of the resulting polyester resin (unmodified polyester resin) having a group having active hydrogen (active hydrogen group), obtained by the polycondensation reaction, with a polyvalent isocyanate compound.

Here, the active hydrogen group in the unmodified polyester resin may include a hydroxyl group (alcoholic hydroxyl group), amino group, a carboxyl group, and the like. Of these, the hydroxyl group (alcoholic hydroxyl group) is preferable.

The polyvalent carboxylic acid and the polyhydric alcohol, which are used for obtaining the amorphous polyester resin (unmodified polyester resin), are not particularly limited, and any known compound may be used.

The polyvalent carboxylic acid may include, for example, aromatic carboxylic acids such as terephthalic acid, isophthalic acid, phthalic anhydride and trimellitic anhydride; aliphatic carboxylic acids such as fumaric acid; lower alkyl esters and acid anhydride thereof, and the like. As the polyvalent carboxylic acid, in addition to the compounds described above, aliphatic carboxylic acids having a saturated hydrocarbon group such as adipic acid and azelaic acid, and lower alkyl esters and acid anhydrides thereof may be used. The polyvalent carboxylic acids may be used alone or as a mixture of two or more kinds.

The polyhydric alcohol may include, for example, bisphenols, and alkylene oxide adducts thereof, and the like. Of these, it is preferable to use an ethylene oxide adduct or a propylene oxide adduct with bisphenol A, in terms of the improvement of the charging uniformity. The polyhydric alcohols may be used alone or as a mixture of two or more kinds.

The method of obtaining the amorphous polyester resin (unmodified polyester resin) is not particularly limited, and the explanation of the method is the same as in the item <<Crystalline Polyester Resin Unit>>, and the detailed explanation thereof is omitted here.

The amorphous polyester resin, which is obtained in the polycondensation reaction of the polyvalent carboxylic acid and the polyhydric alcohol as listed above, is reacted with the polyvalent isocyanate compound, and, thus, the isocyanate modified polyester resin can be obtained.

The polyvalent isocyanate compound, which can be used here, is not particularly limited, and examples thereof may include aliphatic polyisocyanates such as tetramethylene diisocyanate and α,α,α',α'-tetramethylxylylene diisocyanate; alicyclic polyisocyanates such as isophorone diisocyanate and cyclohexylmethane diisocyanate; aromatic diisocyanates such as tolylene diisocyanate; isocyanurates; and the aliphatic polyisocyanate or the alicyclic polyisocyanate blocked with a phenol derivative, oxime, or caprolactam, and the like. They may be used alone or as a mixture of two or more kinds. The polyvalent isocyanate compound is reacted with the amorphous polyester resin (unmodified polyester resin) in a known method thereby obtaining an isocyanate-modified polyester resin.

On the other hand, the amino-modified polyester resin can be obtained by polycondensation reaction of the polyvalent carboxylic acid and the polyhydric alcohol, and reaction of the resulting amorphous polyester resin (unmodified polyester resin) with an amine compound.

Here, the amino-modified polyester resin encompasses a resin whose structure is formed by introduction of amino groups at its ends, and a resin whose structure is formed by introduction of amino groups into parts other than ends, i.e., into its main chain. The amino-modified polyester resin having a structure formed by introduction of amino groups at its ends can be obtained in a method using, as the amine compound, a compound (which hereinafter may sometimes to be referred to as "amine compound (a)") having a functional group capable of reacting an alcohol residue (hydroxyl group) derived from the polyhydric alcohol in the non-modified amorphous polyester resin. However, a method is preferable which uses a compound (which hereinafter may sometimes be referred to as "amine compound (b)") having a functional group capable of reacting a carboxylic acid residue (carboxyl group) derived from the polyvalent carboxylic acid in the non-modified amorphous polyester resin, in the terms of the easiness of reaction.

The amine compound (a) is not particularly limited, and may include aminocarboxylic acids such as aminopropionic acid, arginine, aspartic acid and glutamine, and derivatives of these compounds.

The amine compound (b) may include aminoalcohol, polyvalent amine compound, and derivatives of these compounds.

The aminoalcohol may include, for example, aminoethanol, N,N-dimethy-2-aminoethanol, 3-amino-1-propanol, and the like. Of these, N,N-dimethyl-2-aminoethanol is preferable, in terms of the reactivity and easy acquisition.

The polyvalent amine compound may include diamins including aromatic diamines such as phenylenediamine and 4,4'-diaminodiphenylmethane; alicyclic diamines such as diaminecyclohexane and isophoronediamine; aliphatic diamines such as ethylenediamine; polyvalent amines including tri- or more-valent amines such as diethylenetriamine.

The derivatives of the compound described above may include ketimine compounds which are obtained from the amine compound (a) or the amine compound (b) and a ketone (acetone, methyl ethyl ketone, methyl isobutyl ketone, or the like), and oxazoline compounds. Of these, ketimine compounds obtained from isophoronediamine and methyl ethyl ketone are preferable in the terms of the reactivity.

The amine compounds may be used alone or as a mixture of two or more kinds. The amino-modified polyester resin can be obtained by reacting the amine compound with the amorphous polyester resin (unmodified polyester resin) in a known method. As the amorphous polyester resin (unmodified polyester resin), the same as those for obtaining the isocyanate modified polyester resin may be used.

It is preferable that the isocyanate modified polyester resin and the amino-modified polyester resin are further polymerized with a compound capable of chemically bonding to the crystalline polyester resin unit. Specifically, it is preferable to use a compound capable of bonding to the hydroxyl group [—OH] derived from the polyhydric alcohol or the carboxyl group [—COOH] derived from the polyvalent carboxylic acid, which are contained in the crystalline polyester resin unit, through an ester linkage.

Such compounds may include polyvalent, for example, tri- or more-valent carboxylic acids such as trimellitic acid; lower alkyl esters and acid anhydrides thereof; and polyhydric alcohol, for example tri- or more-hydric alcohols, such as 1,2,3-butanetriol and 2-methyl-1,2,3-propanetriol.

The polyurea resin can be obtained by polycondensation reaction of the amino-modified polyester resin with the isocyanate modified polyester resin. The reaction conditions are not particularly limited, and known methods can be used as they are, or they can be used with appropriate modifications.

<<Production Method of Hybrid Crystalline Polyester Resin (Hybrid Resin)>>

The method for producing a hybrid resin contained in the binder resin according to the present invention is not particularly limited, so long as it can form a polymer having a structure in which the crystalline polyester resin unit is molecularly bonded to the amorphous resin unit. As specific production methods of the hybrid resin, for example, the following methods are shown.

(1) A Method for Producing the Hybrid Resin in which an Amorphous Resin Unit is Previously Polymerized, and then the Polymerization Reaction to Form a Crystalline Polyester Resin Unit is Performed in the Presence of the Amorphous Resin Unit According to this method, first the monomers capable of forming an amorphous resin unit (or resin capable of forming an amorphous resin unit) are reacted to form the amorphous resin unit. Next, the polymerization of a polyvalent carboxylic acid and a polyhydric alcohol is performed in the presence of the amorphous resin unit, thereby forming a crystalline polyester resin unit. At this time, the condensation reaction of the polyvalent carboxylic acid and the polyhydric alcohol is performed and, at the same time, the polyvalent carboxylic acid or the polyhydric alcohol is reacted to the amorphous resin unit, thereby forming the hybrid resin.

In the method described above, it is preferable to incorporate, in the crystalline polyester resin unit or the amorphous resin unit, sites which enable these units to react with each other. Specifically, when the amorphous resin unit is formed, in addition of the monomers forming the amorphous resin unit, a compound having sites reactive with the carboxyl group [—COOH] or the hydroxyl group [—OH] remaining in the crystalline polyester resin unit, and sites reactive with the amorphous resin unit is used. This compound reacts with the carboxyl group [—COOH] or the hydroxyl group [—OH] in the crystalline polyester resin unit, and, thus, the crystalline polyester resin unit can be chemically bonded to the amorphous resin unit.

Alternatively, when the crystalline polyester resin unit is formed, a compound having sites reactive with the polyhydric alcohol or the polyvalent carboxylic acid, and sites reactive with the amorphous resin unit may be used.

The hybrid resin having a structure (graft-structure) in which a crystalline polyester resin unit is molecularly bonded to an amorphous resin unit can be formed by using the method described above.

(2) A Method for Producing the Hybrid Resin in which a Crystalline Polyester Resin Unit and an Amorphous Resin Unit are Separately Formed, and then they are Bonded to Each Other According to this method, first, the condensation reaction of a polyvalent carboxylic acid and a polyhydric alcohol is performed to form a crystalline polyester resin unit. Apart from the reaction system for forming the crystalline polyester resin unit, an amorphous resin unit is formed by polymerizing the above-mentioned monomers for forming the amorphous resin unit. At that time, it is preferable to incorporate, in the crystalline polyester resin unit and the amorphous resin unit, sites which enable these units to react with each other. The incorporation method of such reactive sites is as described above, and the detailed explanation thereof is omitted here.

Next, the crystalline polyester resin unit and the amorphous resin unit, formed as above, are reacted with each other, and, thus, the hybrid resin having a structure in which a crystalline polyester resin unit is molecularly bonded to an amorphous resin unit can be formed.

When the reactive sites are not incorporated into the crystalline polyester resin unit nor the amorphous resin unit, the following method may be adopted. Namely, a system containing both of the crystalline polyester resin unit and the amorphous resin unit is prepared, and then, a compound having sites which are reactive with the crystalline polyester resin unit and the amorphous resin unit is introduced in to the system. Thus, the hybrid having the structure in which a crystalline polyester resin unit is molecularly bonded to an amorphous resin unit through the compound can be formed.

Among the forming methods (1) and (2), the method (1) is preferable because it is easy to form the hybrid resin having a structure in which a crystalline polyester resin chain is grafted to an amorphous resin chain, and the production steps can be simplified. According to the method (1), an amorphous resin unit is previously formed, and then a crystalline polyester resin unit is bonded thereto, and thus the orientation of the crystalline polyester resin unit becomes easily even, and preferably the hybrid resin, which is suitably used in the toner defined in the present invention, can be surely formed.

(Amorphous Resin)

The amorphous resin forms, in addition to the hybrid resin, the binder resin. The amorphous resin is not particularly limited, and has no melting point and has a comparatively high glass transition temperature (Tg) in the differential scanning calorimetry (DSC) of the resin. The amorphous resin has a Tg1 of preferably 35 to 80° C., particularly preferably 45 to 65° C., wherein Tg1 is a glass transition temperature in the first heating process in the DSC measurement. The amorphous resin has a Tg2 of preferably 20 to 70° C., particularly preferably 30 to 55° C., wherein Tg2 is a glass transition temperature in the second heating process in the DSC measurement. The glass transition temperatures (Tg1 and Tg2) can be measured in a method described in Examples.

The amorphous resin has a weight average molecular weight (Mw) of preferably 5,000 to 150,000, more preferably 10,000 to 70,000, because the plasticity can easily be controlled.

The amorphous resin contains preferably a resin component forming the unit described in the item <<Amorphous Resin Unit Other Than Polyester Resin>>; in other words, it is preferable that the amorphous resin is a vinyl resin, a urethane resin, a urea resin or the like. The amorphous resin may be amorphous polyester resin such as a styrene-acrylic modified polyester resin.

It is preferable that the amorphous resin contained in the binder resin is formed of the same resin as the amorphous resin unit in the hybrid resin. Here, the phrase "formed in the same resin" encompasses a form formed of only the same resin, and a form formed of the same resin and another amorphous resin. However, when the amorphous resin contains the same resin and the other amorphous resin, the content of the same resin is preferably 15% by mass or more relative to the total amount of the amorphous resin, more preferably 20% by mass or more (the upper limit is less than 100% by mass).

The amorphous resin may be a copolymer having a unit derived from the same resin as the amorphous resin unit in the hybrid resin and a unit derived from another amorphous resin. At that time, the copolymer may be any of copolymer of a block-copolymer and a graft-copolymer, and a graft-copolymer is preferable, because the compatibility with the hybrid resin can easily be controlled. In this case, the content of the unit derived from the same resin as the amorphous resin unit in the hybrid resin is preferably 15% by mass or more, relative to the total amount of the amorphous resin, more preferably 20% by mass or more (the upper limit is less than 100% by mass).

The definition of "the same resin" is as explained in the item <<Amorphous Resin Unit Other Than Polyester Resin>>, and thus the detailed explanation is omitted here.

As the resin used as the amorphous resin, a vinyl resin, a polyurea resin, and a styrene-acrylic modified polyester resin are preferably used among the resin described above, and a vinyl resin is particularly preferably used. A vinyl resin and a styrene-acrylic modified polyester resin are preferable, when the amorphous resin unit in the hybrid resin is a vinyl resin unit, because the compatibility with the hybrid resin can easily be controlled, and the values of $\Delta H1$ and $\Delta H2$ can easily be controlled. In addition, a polyurea resin is preferable, particularly when the amorphous resin unit in the hybrid resin is a polyurea resin unit, because the compatibility with the hybrid resin can easily be controlled and the values of $\Delta H1$ and $\Delta H2$ can easily be controlled.

Accordingly, a vinyl resin, a styrene-acrylic modified polyester resin and a polyurea resin are explained below, respectively.

<<Vinyl Resin>>

When a vinyl resin is used as the amorphous resin, the vinyl resin is not particularly limited, so long as it is obtained by polymerization of a vinyl compound, and may include, for example, an acrylic ester resin, a styrene-acrylic ester resin, an ethylene-vinyl acetate resin, and the like. They may be used alone or as a mixture of two or more kinds.

Among the vinyl resins, a styrene-acrylic ester resin (styrene-acrylic resin) is preferable, considering the plasticity upon the heat fixation.

As a monomer forming a styrene-acrylic resin, the same compounds as the monomer which forms the styrene-acrylic resin unit listed in the item <<Amorphous Resin Unit Other Than Polyester Resin>> may be used.

The detailed explanation thereof, accordingly, is omitted, but as a styrene monomer may be preferably used o-methylstyrene, m-methylstyrene, p-methylstyrene, α-methylstyrene, p-phenylstyrene, and p-ethylstyrene; as a (meth)acrylic ester monomer may preferably be used acrylic ester monomers such as methyl acrylate, ethyl acrylate, isopropyl acrylate, n-butyl acrylate and isobutyl acrylate, and methacrylic esters such as methyl methacrylate, ethyl methacrylate, n-butyl methacrylate, isopropyl methacrylate and isobutyl methacrylate. A styrene monomers and a (meth)acrylic ester monomers may be used alone or as a mixture of two or more kinds.

Another monomer may be polymerized thereto, and examples thereof may include acrylic acid, methacrylic acid, maleic acid, itaconic acid, cinnamic acid, fumaric acid, maleate monoalkyl ester, itaconic acid monoalkyl ester, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and the like.

The content of the structural units derived from a styrene monomer in a styrene-acrylic resin is preferably from 40 to 90% by mass relative to the total amount of the styrene-acrylic resin. In addition, the content of the structural units derived from a (meth)acrylic ester monomer in a styrene-acrylic resin is preferably from 10 to 60% by mass relative to the total amount of the styrene-acrylic resin. When the contents are within the ranges described above, the plasticity of the amorphous resin can easily be controlled.

The content of the structural units derived from the monomers other than the components described above in the styrene-acrylic resin is preferably from 0.5 to 30% by mass relative to the total amount of the styrene-acrylic resin.

The method for producing the styrene-acrylic resin is not particularly limited, and the resin can be produced in the same method as the method for producing the styrene-acrylic resin unit explained in the item <<Amorphous Resin Unit Other Than Polyester Resin>>.

<<Styrene Acrylic-Modified Polyester Resin>>

An amorphous styrene-acrylic modified polyester resin may be used as the amorphous resin. Here, "styrene-acrylic modified polyester resin" refers to a resin formed of polyester molecules having a structure in which a styrene-acrylic copolymer molecular chain (which hereinafter may sometimes be referred to as "styrene-acrylic copolymer segment") is molecularly bonded to an amorphous polyester molecular chain (which hereinafter may sometimes be referred to as "polyester segment"); in other word, the styrene-acrylic modified polyester resin is a resin having a copolymer structure in which a styrene-acrylic copolymer segment is covalently bonded to a polyester segment.

Here, the styrene-acrylic modified polyester resin, used as the amorphous resin, is clearly distinguished from the hybrid resin described above in the following point: The polyester segment, forming the amorphous styrene-acrylic modified polyester resin is an amorphous molecular chain having no clear melting point but having a comparatively high glass transition temperature (Tg), unlike the crystalline polyester resin unit forming the hybrid resin. This can be confirmed by performing the differential scanning calorimetry (DSC) of the toner. In addition, they can also be distinguished by an analysis such as NMR, because the monomer (chemical structure) forming the polyester segment is different from the monomer (chemical structure) forming the crystalline polyester resin unit.

The above-mentioned polyester segment is formed of a polyhydric alcohol component and a polyvalent carboxylic acid component.

The polyhydric alcohol component is not particularly limited, and aromatic diols and derivative thereof are preferable, in the terms of the electrification property and the toner strength. Examples thereof may include bisphenols such as bisphenol A and bisphenol F; alkylene oxide adducts thereof, such as ethylene oxide adducts and propylene oxide adducts, of the bisphenol, and the like.

Of these, in particular, it is preferable to use an ethylene oxide adducts or a propylene oxide adducts of bisphenol A as the polyhydric alcohol component, because the charging uniformity of the toner can be improved. The polyhydric alcohol components may be used alone or as a mixture of two or more kinds.

The polyvalent carboxylic acid component which is condensed with the polyhydric alcohol component may include, for example, aromatic carboxylic acids such as terephthalic acid, isophthalic acid, phthalic anhydride, trimellitic anhydride, pyromellitic acid, and naphthalene dicarboxylic acid; aliphatic carboxylic acids such as fumaric acid, maleic anhydride, and alkenyl succinic acid; lower alkyl esters and acid anhydrides of these acids, and the like. They may be used alone or as a mixture of two or more kinds.

The method for forming the polyester segment is not particularly limited, and it can be produced in the same manner as the method for forming the crystalline polyester resin unit explained in the item <<Crystalline Polyester Resin Unit>>.

The styrene-acrylic copolymer segment is a molecular chain derived from the same monomer as that in the styrene-acrylic resin segment explained in the item <<Amorphous Resin Unit Other Than Polyester Resin>>. Accordingly, the detailed explanation of kinds and composition ratios of the monomer forming the segment and production methods of the segment are omitted.

The content of the polyester segment in the styrene-acrylic modified polyester resin is preferably from 40 to 90% by mass relative to the total amount of the styrene-acrylic modified polyester resin. In addition, the content of the styrene-acrylic copolymer segment in the styrene-acrylic modified polyester resin is preferably from 10 to 60% by mass relative to the total amount of the styrene-acrylic modified polyester resin. When the contents are within the range described above, the plasticity of the styrene-acrylic modified polyester resin can easily be controlled.

<<Polyurea Resin>>

As the polyurea resin which is used as the amorphous resin, it is possible to use the same monomer as explained in the item "Urea Resin Unit" in the item <<Amorphous Resin Unit Other Than Polyester Resin>>, and as the production method thereof, known production methods may be used as they are, or they can be used with appropriate modifications. The detailed explanation, accordingly, is omitted here.

(From of Binder Resin)

The binder resin contained in the toner of the present invention may be in any form (form of a resin particle) so long as it contains a hybrid resin and an amorphous resin.

For example, resin particle (binder resin particles) formed from the binder resin may have a so-called single layer structure or a core-shell structure (a form in which a resin forming a shell part is aggregated on and fused to the surface of a core particle). The resin particles having the core-shell structure have a resin area (shell part) having a comparatively high glass transition temperature on the surface of a resin particle (core particle) containing a colorant or wax and having a comparatively low glass transition temperature.

The core-shell structure is not limited to a structure in which the core particle is completely coated with the shell part, but encompasses, for example, a structure in which the core particle is not completely coated with the shell part and the core particle is exposed in places.

The cross-sectional structure of the core-shell structure can be confirmed by using a known means, for example, a transmission electron microscope (TEM) or a scanning probe microscope (SPM), and the like.

The resin particles having the core-shell structure may be employed so long as the hybrid resin and the amorphous resin are contained in either the core particles or the shell part. A form in which at least the hybrid resin is contained in the core particle is preferable, because the decrease of the electrification property due to the crystalline polyester resin unit could be suppressed, and the charging uniformity could be further improved. At that time, the amorphous resin may be contained in either of the core particle and the shell part, and a form in which the core particle contain the hybrid resin and the amorphous resin and the shell part contains the amorphous resin is particularly preferable. Such a form can increase the affinity of the hybrid resin with the amorphous resin in the core particles, and it is difficult to expose the hybrid resin to the surface. As a result, the mechanical strength can also be improved.

The content of the core part is preferably from 30 to 95% by mass relative to 100% by mass of the total resin amount of the core part and shell part.

<Other Component>

The toner of the present invention may contain, in addition to the essential components described above, internal additives such as a release agent, a colorant and a charge control agent; and external additives such as inorganic fine particles, organic fine particles and lubricant, if necessary.

(Release Agent (Wax))

The release agent forming the toner is not particularly limited, and any known agent can be used. Specifically, examples thereof may include polyolefin wax such as polyethylene wax and polypropylene wax; branched chain hydrocarbon wax such as microcrystalline wax; long chain hydrocarbon wax such as paraffin wax and sasol wax; dialkyl ketone wax such as distearyl ketone; ester wax such as carnauba wax, montan wax, behenyl behenate, trimethylol propane tribehenate, pentaerythritol tetrabehenate, pentaerythritol diacetate dibehenate, glycerol tribehenate, 1,18-octadecanediol distearate, tristearyl trimellitate, and distearyl malate; amide wax such as ethylenediamine behenyl amide and tristearyl trimellitate amide, and the like.

The melting point of the release agent is preferably from 40 to 160° C., more preferably from 50 to 120° C. When the melting point is within the range described above, the heat-resistant storage property of the toner can be ensured, and the toner image can be stably formed without occurrence of cold offset, even if the fixation is performed at a low temperature. The content of the release agent in the toner is preferably from 1 to 30% by mass, more preferably from 5 to 20% by mass.

<Colorant>

Any of carbon black, a magnetic material, a dye or a pigment may be optionally used as the colorant capable of forming the toner. As the carbon black, channel black, furnace black, acetylene black, thermal black, lamp black, or the like may be used. As the magnetic material, ferromagnetic metals such as iron, nickel and cobalt; alloy including the metal described above; ferromagnetic metal compounds such as ferrite and magnetite; alloy containing no ferromagnetic metal but showing the ferromagnetic property by heat-treatment, such as an alloy called as Heusler alloy, for example, manganese-copper-aluminum, manganese-copper-tin, chromium dioxide, or the like may be used.

As the black colorant, for example, carbon black such as furnace black, channel black, acetylene black, thermal black or lamp black, or magnetic powder such as magnetite or ferrite may be used.

The magenta or red colorant may include C. I. Pigment Red 2, 3, 5, 6, 7, 15, 16, 48:1, 53:1, 57:1, 60, 63, 64, 68, 81, 83, 87, 88, 89, 90, 112, 114, 122, 123, 139, 144, 149, 150, 163, 166, 170, 177, 178, 184, 202, 206, 207, 209, 222, 238, 269, and the like.

The orange or yellow colorant may include C. I. Pigment Orange 31, 43, C. I. Pigment Yellow 12, 14, 15, 17, 74, 83, 93, 94, 138, 155, 162, 180, 185, and the like.

The green or cyan colorant may include C.I. Pigment Blue 2, 3, 15, 15:2, 15:3, 15:4, 16, 17, 60, 62 and 66, C. I. Pigment Green 7, and the like.

The colorant may be used alone or two or more kinds thereof may be selected and used if necessary.

The addition amount of the colorant is preferably from 1 to 30% by mass, relative to the whole toner, more preferably from 2 to 20% by mass. The mixture thereof may be used. When the amount is within the range described above, the color reproductivity of the image can be ensured.

The size of the colorant is preferably from 10 to 1000 nm, in a volume average particle size, preferably from 50 to 500 nm, more preferably from 80 to 300 nm.

<Charge Control Agent>

As the charge control agent, various known compounds can be used such as nigrosine-based dyes, metal salts of naphthenic acid or higher fatty acid, alkoxylated amine, quaternary ammonium salt compounds, azo-based metal complexes, and metal salts of salicylic acid.

The addition amount of the charge control agent is generally from 0.1 to 10% by mass, relative to 100% by weight of the binder resin in the finally obtained toner particles, preferably from 0.5 to 5% by mass.

The size of the charge control agent particles is from 10 to 1000 nm in a number average primary particle size, preferably from 50 to 500 nm, more preferably from 80 to 300 nm.

<External Additive>

In order to improve the electrification property, fluidity or cleaning property of the toner, known particles such as inorganic fine particles or organic fine particles, or lubricant can be added to the surface of toner particles as the external additive.

Preferable inorganic fine particles may include inorganic fine particles formed of silica, titania, alumina or strontium titanate.

The inorganic fine particles may be subjected to a hydrophobization treatment if necessary.

As the organic fine particles, spherical organic fine particles having a number average primary particle size of about 10 to 2000 nm can be used. Specifically, it is possible to use organic fine particles formed of a homopolymer of styrene or methyl methacrylate, or a copolymer thereof.

The lubricant is used in order to further improve the cleaning property or the transcription property. The lubricant may include, for example, metal salts of a higher fatty acid such as zinc, aluminum, copper, magnesium, and calcium salts of stearic acid; zinc, manganese, iron, copper, and magnesium salts of oleic acid; zinc, copper, magnesium, and calcium salts of palmitic acid; zinc and calcium salts of linoleic acid; and zinc and calcium salts of ricinoleic acid. The external additives may be used as a mixture of various kinds.

The addition amount of the external additive is preferably from 0.1 to 10.0% by mass relative to 100% by mass of the toner particles.

The method of adding the external additive may include addition methods using known various mixing apparatus such as a turbular mixer, a Henschel mixer, a Nauta mixer, or a V-shaped mixer.

[Toner for Electrostatic Charge Image Development (Toner)]

The toner of the present invention has preferably an average particle size of 3.0 to 8.0 µm in a volume average particle size, more preferably 4.0 to 7.5 µm. When the particle size is within the range described above, the number of toner particles having a large adhesion, which causes fixation offset in which the particles fly and adhere to a heating member upon the fixation, is decreased, and the transcription efficacy is increased, and, thus, the half-tone image quality is improved and the image quality of thin lines and dots are improved. In addition the toner fluidity can be ensured.

The average particle size of the toner can be controlled by adjusting a concentration of an aggregating agent, an addition amount of a solvent, a fusion time, and a composition of the binder resin in an aggregation and fusion step during the production of the toner.

The toner for electrostatic charge image development in the present invention has an average circularity, shown by the following mathematical formula 1, of preferably 0.920 to 1.000, more preferably 0.940 to 0.995, in the terms of the improvement of the transcription efficacy.

[Math. 5]

$$\text{Average Circularity} = \text{Perimeter of Circle Obtained from Equivalent Circular Diameter} / \text{Perimeter of Projection Image of Particle} \quad \text{Mathematical Formula 1}$$

The average circularity can be measured using, for example, an average circularity measuring apparatus "FPIA-2100" (manufactured by Sysmex Corporation).

<Production Method of Toner of Present Invention>

The method for producing the toner of the present invention is not particularly limited, and may include known methods such as a kneading and pulverizing method, a suspension polymerization method, an emulsification aggregation method, a dissolution suspension method, a polyester elongation method, and dispersion polymerization method.

Of these, it is preferable to employ the emulsification aggregation method, in terms of the uniformity of the particle size, the controllability of the shape, and easiness of the core-shell structure formation. The following explanation is made about the emulsification aggregation method.

(Emulsification Aggregation Method)

According to the emulsification aggregation method, a dispersion liquid, in which fine particles of a resin (which hereinafter may sometimes be referred to as "resin fine particles") dispersed by a surfactant or a dispersion stabilizer, is mixed with a dispersion liquid containing components forming the toner particles such as fine particles of the colorant, then a aggregating agent is added thereto, and the aggregation is performed until toner having a desired toner particle size is obtained. After that or at the time of the aggregation, the resin fine particles are fused each other, and the shape of particle aggregate is controlled, and, thus, the toner particles are formed.

Here, the resin fine particles may be composite particles formed of two or more layers, which layers have a different resin composition from the others.

The resin fine particles can be produced, for example, by an emulsion polymerization method, a mini-emulsion polymerization method, a phase inversion emulsification method, or combination of the several methods. When the internal additive is contained into the resin fine particles, it is preferable to use the mini-emulsion polymerization method.

When the internal additive is contained into the toner particles, the resin fine particles may contain the internal additive, or a dispersion liquid of internal additive fine particles containing only the internal additive is separately prepared, and when the resin fine particles are aggregated the internal additive fine particles may be aggregated together therewith.

According to the emulsification aggregation method, the toner particles having a core-shell structure can also be obtained. Specifically, first, binder resin fine particles for a core particle and a colorant are aggregated (and fused) to produce core particles, and then binder resin fine particles for a shell part are added to a dispersion liquid of core particles to aggregate and fuse the binder resin fine particles for the shell part on the surface of core particle thereby forming the shell part coated on the core particle surface, thus resulting in obtaining the toner particles having the core-shell structure.

In a case where the toner is produced according to the emulsification aggregation method, a method for producing the toner of a preferable embodiment contains a step (a) of preparing dispersion liquid containing the hybrid crystalline polyester resin fine particles and dispersion liquid containing the amorphous resin fine particles (which hereinafter may sometimes be referred to as "preparation step"); and a step (b) of mixing the dispersion liquid containing the hybrid crystalline polyester resin fine particles with the dispersion liquid containing the amorphous resin fine particles to cause aggregation and fusion (which hereinafter may sometimes be referred to as "aggregation and fusion step").

The steps (a) and (b), and optional steps (c) to (e) other than the above steps are explained in detail.

(a) Preparation Step

The step (a) contains a step of preparing the dispersion liquid containing the hybrid crystalline polyester resin fine particles, a step of preparing the dispersion liquid containing the amorphous resin fine particles, and, if necessary, a step of preparing dispersion liquid containing the colorant, a step of preparing dispersion liquid containing the release agent fine particles, and the like.

(a-1) Step of Preparing Dispersion Liquid Containing Hybrid Crystalline Polyester Resin Fine Particles In the step of preparing dispersion liquid containing the hybrid crystalline polyester resin (hybrid resin) fine particles, a hybrid resin forming the toner particles is synthesized, and the resulting hybrid resin is dispersed in an aqueous medium in a fine particle state to prepare the dispersion liquid containing the hybrid resin fine particles.

The production method of the hybrid resin is as described above, and thus the detailed explanation is omitted. It is preferable that the content ratio of the crystalline polyester resin unit to the amorphous resin unit in the hybrid resin is adjusted in the preferable range described above, in order to satisfy the formulas (1) and (2). It is also preferable that the kinds (chemical structures) of the hybrid resin and the amorphous resin, in particular the number (C (alcohol)) of the carbon atoms in the polyhydric alcohol component forming the crystalline polyester resin unit in the hybrid resin and the number (C (acid)) of carbon atoms in the polyvalent carboxylic acid component are controlled to the preferable ranges described above.

The dispersion liquid containing the hybrid resin fine particles is produced in a method in which a dispersion treatment is performed in an aqueous medium without using a solvent; a method in which the hybrid resin is dissolved in a solvent such as ethyl acetate, the solution is emulsified or dispersed in an aqueous medium using a dispersion apparatus, and then a desolvation treatment is performed, or the like.

In the present invention, the "aqueous medium" refers to a medium containing at least 50% by mass of water. Components other than the water may include organic solvent capable of dissolving in water, such as methanol, ethanol, isopropanol, butanol, acetone, methyl ethyl ketone, dimethyl formamide, methyl cellosolve, tetrahydrofuran, and the like. Of these, it is preferable to use alcoholic organic solvents, which do not dissolve a resin, such as methanol, ethanol, isopropanol and butanol. It is preferable to use water alone as the aqueous medium.

The hybrid resin may sometimes contain carboxyl groups in the crystalline polyester resin unit. In such a case, ammonia or sodium hydroxide may be added to the system, in order to ion-separate the carboxyl groups contained in the unit and stably emulsify them in the aqueous phase, and, thus, the emulsification is smoothly advanced.

A dispersion stabilizer may also be dissolved in the aqueous medium, and a surfactant or resin fine particles may be added thereto, in order to improve the dispersion stability of oil droplets.

Known stabilizers can be used as the dispersion stabilizer, and it is preferable to use a stabilizer soluble in acid and alkali, for example, tricalcium phosphate, and it is also preferable to use a stabilizer which can be decomposed by an enzyme, in terms of the environmental aspect.

A known anionic surfactant, cationic surfactant, non-ionic surfactant or amphoteric surfactant may be used as the surfactant.

The resin fine particles, used for improve the dispersion stability, may include poly(methyl methacrylate) resin fine particles, polystyrene resin fine particles, polystyrene-acrylonitrile resin fine particles, and the like.

The dispersion treatment as described above can be performed utilizing a mechanical energy. The dispersing apparatus is not particularly limited, and examples thereof may include a homogenizer, a low speed shear type dispersing apparatus, a high speed shearing-dispersing apparatus, a friction dispersing apparatus, a high pressure jet dispersing apparatus, an ultrasonic dispersing apparatus, a high pressure impact dispersing apparatus, Altimizer, and the like.

The particle size of the hybrid resin fine particles (oil droplets) in the dispersion liquid containing the hybrid resin fine particles prepared as above is preferably from 60 to 1000 nm in a median diameter based on the volume, more preferably from 80 to 500 nm. The volume average particle size is measured in a method described in Examples. The volume average particle size of the oil droplets can be controlled by controlling an amount of a mechanical energy at the emulsification or dispersion.

The content of the hybrid resin fine particles in the dispersion liquid containing the hybrid resin fine particles is preferably within the range of 10 to 50% by mass relative to 100% by mass of the dispersion liquid, more preferably 15 to 40% by mass. When the content is within the range described above, the expansion of the particle distribution can be suppressed, and the toner properties can be improved.

(a-2) Preparation Step of Dispersion Liquid Containing Amorphous Resin Fine Particles The step of preparing the dispersion liquid containing the amorphous resin fine particles is a step in which the amorphous resin forming the toner particles is synthesized, and the resulting amorphous resin is dispersed in an aqueous medium in a fine particle state to prepare the dispersion liquid containing the amorphous resin fine particles.

The production method of the amorphous resin is as described above, and thus the detailed explanation is omitted.

The method for dispersing the amorphous resin in an aqueous medium includes a method (I) in which amorphous resin fine particles are formed from monomers for obtaining the amorphous resin, and an aqueous dispersion containing the resulting amorphous resin fine particles is prepared; a method (II) in which an amorphous resin is dissolved or dispersed in an organic medium (solvent) to prepare an oil phase liquid, the oil phase liquid is dispersed in an aqueous medium by a phase inversion emulsification, or the like, oil droplets having a desired particle size are formed, and then the organic medium (solvent) is removed therefrom.

In the method (I), first, the monomer for obtaining the amorphous resin is added to the aqueous medium together with a polymerization initiator, and the polymerization is performed, thereby obtaining base particles. Next, a means is preferably used, in which a radical-polymerizable monomer for obtaining the amorphous resin and a polymerization initiator are added to the dispersion liquid in which the resin fine particles are dispersed, and then, the base particles are seed-polymerized with the radical-polymerizable monomer.

At that time, a water-soluble polymerization initiator can be used as the polymerization initiator. As the water-soluble polymerization initiator, for example, a water-soluble radical-polymerization initiator such as potassium persulphate or ammonium persulphate is preferably used.

In the seed-polymerization reaction system for obtaining the amorphous resin fine particles, a generally used, chain-transfer agent can be used, in order to control the molecular weight of the amorphous resin. As the chain-transfer agent, mercaptan such as octyl mercaptan, dodecylmercaptan, or t-dodecyl mercaptan; mercaptopropionic acid such as n-octyl 3-mercaptopropionate, or stearyl 3-mercaptopropionate; or styrene dimer may be used. They may be used alone or as a mixture of two or more kinds.

In the method (I), when the amorphous resin fine particles is formed from the monomer for obtaining the amorphous resin, a release agent may be contained by dispersing the release agent together with the monomer.

As the organic medium (solvent) used for preparing the oil phase liquid in the method (II), solvents having a low boiling point and a low solubility in water are preferable, because the removal treatment thereof is easy after the formation of the oil droplets, as described above. Specific examples thereof may include methyl acetate, ethyl acetate, methyl ethyl ketone, isopropyl alcohol, methyl isobutyl ketone, toluene, xylene, and the like. They may be used alone or as a mixture of two or more kinds.

The amount (the total amount if the two or more media are used) of the organic medium (solvent) used is generally from 10 to 500 parts by mass relative to 100 parts by mass of the amorphous resin, preferably from 100 to 450 parts by mass, more preferably from 200 to 400 parts by mass.

The amount of the aqueous medium used is preferably from 50 to 2,000 parts by mass relative to 100 parts by mass of the oil phase liquid, more preferably from 100 to 1,000 parts by mass. When the amount of the aqueous medium used is within the range described above, the oil phase liquid having a desired particle size can be emulsified or dispersed in the aqueous medium.

A dispersion stabilizer may be dissolved in the aqueous medium as above, or a surfactant or resin fine particles may be added thereto, in order to improve the dispersion stability of the oil droplets.

The emulsification or dispersion of the oil phase liquid can be performed utilizing a mechanical energy, as described above. A dispersing apparatus for emulsification or dispersion is not particularly limited, and the apparatus explained in (a-1) above can be used.

The removal of the organic medium after the formation of the oil droplets can be performed by an operation in which the whole dispersion liquid in which the amorphous resin fine particles are dispersed in the aqueous medium is gradually heated with stirring, strong stirring is applied to the dispersion in a certain temperature range, and then the solvent is removed. Alternatively, the removal can be performed by reducing the pressure using an apparatus such as an evaporator.

The particle size of the amorphous resin fine particles (oil droplets) in the dispersion liquid containing the amorphous resin fine particles, prepared in the method (I) or (II) is preferably from 60 to 1000 nm in a median diameter based on the volume, more preferably from 80 to 500 nm. This volume average particle size is measured in a method described in Examples. The volume average particle size of the oil droplets can be controlled by controlling an amount of a mechanical energy at the emulsification or dispersion.

The content of the amorphous resin fine particles in the dispersion liquid containing the amorphous resin fine particles is preferably in the range of 5 to 50% by mass, more preferably 10 to 30% by mass. When the content is within the range described above, expansion of the particle distribution can be suppressed, and the toner properties can be improved.

(a-3) Preparation Step of Dispersion Liquid Containing Colorant/Preparation Step of Dispersion Liquid Containing Release Agent Fine Particles The step of preparing the dispersion liquid containing the colorant is a step in which the colorant is dispersed in an aqueous medium in a state of fine particles, thereby preparing the dispersion liquid containing the colorant fine particles. The step of preparing the dispersion liquid containing the release agent fine particles is a step which may be performed if necessary when toner particles containing the release agent are desired, and in which the release agent is dispersed in an aqueous medium in a state of fine particles, thereby preparing the dispersion liquid containing the release agent fine particles.

The aqueous medium is the same as those in (a-1) above, and in order to improve the dispersion stability, a surfactant or resin fine particles may be added to the aqueous medium.

The dispersion of the colorant/the release agent can be performed utilizing a mechanical energy. The dispersing apparatus is not particularly limited, and those explained in (a-1) above can be used.

The content of the colorant in the dispersion liquid containing the colorant is preferably in the range of 10 to 50% by mass, more preferably 15 to 40% by mass. When the content is within the range described above, there is an effect of ensuing the color reproductivity. The content of the release agent fine particles in the dispersion liquid containing the release agent fine particles is preferably in the range of 10 to 50% by mass, more preferably 15 to 40% by mass. When the content is within the range described above, the effect of preventing the hot offset and ensuring the separation can be obtained.

(b) Aggregation-Fusion Step

The aggregation-fusion step is a step in which the hybrid resin fine particles, the amorphous resin fine particles, and, if necessary, the colorant particles and/or the release agent fine particles are aggregated in the aqueous medium, and, at the same time of the aggregation, these particles are fused to each other, thereby obtaining a binder resin.

In this step, the dispersion liquids are mixed so that the formulas (1) and (2) are satisfied. Here, it is preferable that the amount of each dispersion liquid is controlled so that the content ratio of the hybrid resin and the amorphous resin in the binder resin is in the preferable range described above, in order to satisfy the formulas (1) and (2).

In this step, first, the hybrid resin fine particles, the amorphous resin fine particles and, if necessary, the colorant particles and/or the release agent fine particles are mixed so that the binder resin satisfying the formulas (1) and (2) is obtained, and these particles are dispersed in an aqueous medium. Next, after an alkali metal salt or a salt containing Group 2 element is added as the aggregating agent, the mixture is heated at a temperature equal to or higher than the glass transition temperatures of the hybrid resin fine particles and the amorphous resin fine particles, thereby the aggregation is advanced and, at the same time, the resin particles are fused to each other.

Specifically, the dispersion liquid containing the hybrid resin fine particles, the dispersion liquid containing the amorphous resin fine particles, which are produced in the manner as described above, and, if necessary, the dispersion liquid containing the colorant and/or the dispersion liquid containing the release agent fine particles are mixed, to which the aggregating agent such as magnesium chloride is added. Thus, the hybrid resin fine particles, the amorphous resin fine particles and, if necessary, the colorant particles and/or the release agent fine particles are aggregated and, at the same time, the particles are fused to each other to form the binder resin. When the size of the aggregated particles reaches the desired size, a salt such as brine is added thereto to stop the aggregation.

The aggregating agent, used in this step, is not particularly limited, and a salt selected from metal salts is preferably used. Examples thereof may include salts of a monovalent metal including an alkali metal such as such as sodium, potassium or lithium; salts of a divalent metal such as calcium, magnesium, manganese or copper; salts of a trivalent metal such as iron or aluminum, and the like. Specifically, the salt may include sodium chloride, potassium chloride, lithium chloride, calcium chloride, magnesium chloride, zinc chloride, copper sulfate, magnesium sulfate, manganese sulfate, and the like. Of these, the divalent metal salts are particularly preferable. When the divalent metal salt is used, the aggregation can be advanced by smaller amount of the salt. The aggregating agents may be used alone or as a mixture of two or more kinds.

In the aggregation step, it is preferable that a time period during which the dispersion is allowed to stand after the aggregating agent (until the heating is started) is set as short as possible. It is, accordingly, preferable that after the aggregating agent is added, the heating of the dispersion liquid for the aggregation is started as fast as possible and the dispersion is heated to a temperature equal to or higher than the glass transition temperatures of the hybrid resin and amorphous resin as fast as possible. The reason thereof is not clear, but problems might occur in which the aggregation state of the particles vary by elapse of the time, and thus the particle distribution of the obtained toner particles becomes unstable or the surface property varies. The time period during which the dispersion is allowed to stand is generally 30 minutes or shorter, preferably 10 minutes or shorter. The temperature at which the aggregating agent is added is not particularly limited, and a temperature equal to or lower than the glass transition temperature of the binder resin of the hybrid resin and the amorphous resin.

In the aggregation step, after the aggregating agent is added, the temperature is preferably fast elevated by heating, and the temperature rising speed is preferably set at 0.8° C./minute or more. The upper limit of the temperature rising speed is not particularly limited, but it is preferably set at 15° C./minute or less, in order to suppress the generation of coarse particles generated by rapidly advancing the fusion. It is also important that after the dispersion liquid for the aggregation heated to the temperature equal to or higher than the glass transition temperature, the temperature of the dispersion liquid for the aggregation is maintained in a certain time, preferably until the median diameter, based on the volume, reaches 4.5 to 7.0 µm, and, thus, the fusion is continued (a first aging step). It is also preferable that an average circularity of the particles is measured during the aging, and the first aging step is continued until the average circularity of the particles reaches 0.920 to 1.000.

From this, both of the growth of the particles (aggregation of the hybrid resin fine particles, the amorphous resin fine particles and, if necessary, the colorant particles/release agent fine particles) and the fusion (disappearance of the interface between the particles) can be effectively advanced, and the durability of the finally obtained toner particles can be improved.

When the binder resin having the core-shell structure is obtained, in the first aging step, an aqueous dispersion liquid containing the resin forming the shell part (preferably the above-mentioned amorphous resin) is further added thereto, thereby aggregating and fusing the resin forming the shell part on the surface of the binder resin particle (core particle) having a single layer structure, obtained as above. The binder resin having the core-shell structure can be obtained in this manner (shell making step). At that time, after the shell making step, it is preferable that the heat treatment of the reaction system is continued until the shell is aggregated and fused more strongly to the core particle surface and the desired shape of the particles is obtained (a second aging step). The second aging step is preferably continued until the average circularity of the toner particles having the core-shell structure reaches the desired range of the average circularity described above.

(c) Cooling Step

The cooling step is a step in which the dispersion liquid containing the toner particles is subjected to a cooling treatment. The cooling speed in the cooling treatment is not particularly limited, and it is preferably from 0.2 to 20° C. The cooling method is not particularly limited, and it may be exemplified by a method in which a coolant is introduced from the outside of a reaction vessel, and a method in which cold water is directly added to the reaction system to cool the dispersion.

(d) Filtration, Washing, and Drying Step

In a filtration step, the toner particles are filtrated from the dispersion liquid containing the toner particles. The filtration method may include a centrifugal separation method, a reduced pressure filtration method using a Nutsche, or the like, a method using a filter press, and the like, and it is not particularly limited.

Next, the particles are washed in a washing step, and, thus, attached substances including the surfactant or the aggregating agent are removed from the filtered toner particles (aggregation in a cake-like form). In the washing treatment, the washing with water is performed until the filtrate shows an electrical conductivity of, for example, 5 to 10 µS/cm.

In a drying step, the toner particles, which have been wash-treated, are subjected to a drying treatment. The dryer used in the drying step may include known dryers such as a spray dryer, a vacuum freeze dryer and a vacuum dryer, and it is also possible to use a dryer with static shelves, a dryer with a moving shelf, a fluidized bed dryer, a rotary dryer, an agitating dryer, or the like. The water content of the dried toner particles is preferably 5% by mass or less, more preferably 2% by mass or less.

When the dried toner particles are aggregated to each other through a week interparticle attractive force, a cracking treatment may be performed. It is possible to use, as an apparatus for cracking, a mechanical cracking apparatus such as a jet mill, Henschel mixer, a coffee mill, or a food processor.

(e) External Additive Treatment Step

This step is a step in which an external additive is added to the surface of the dried toner particles if necessary, which is mixed to produce a toner. The addition of the external additive improves the fluidity or the electrification property of the toner, and the improvement of the cleaning property is realized.

(Developer)

As for the toner as described above, there are some applications, for example, a case where a magnetic material is contained in the toner, and the resulting product is used as one-component magnetic toner, a case where the toner is mixed with a so-called carrier, and the resulting product is used as a two-component developer, a case where the non-magnetic toner is used alone, and any of them can be preferably used.

As the carrier, forming the two-component developer, it is possible to use magnetic particles formed of a conventionally known material including a metal such as iron, ferrite, or magnetite, alloy of such a metal with a metal such as aluminum or lead, and it is particularly preferable to use the ferrite particles.

The volume average particle size of the carrier is preferably from 15 to 100 µm, more preferably from 25 to 60 µm.

It is also preferable to use, as the carrier, a carrier coated with a resin, or a so-called, resin-dispersion type carrier in which magnetic particles are dispersed in the resin. The resin composition for coating is not particularly limited, and, for example, an olefin resin, a cyclohexyl methacrylate-methyl methacrylate copolymer, a styrene resin, a styrene-acrylic resin, a silicone resin, an ester resin, or a fluororesin may be used. As the resin for forming the resin-dispersion type carrier, a known resin can be used without any particular limitation, and it is possible to use, for example, an acrylic resin, a styrene-acrylic resin, a polyester resin, a fluororesin, a phenol resin, or the like.

<Fixing Method>

A preferable fixing method using the toner of the present invention may include a so-called contact heating method. The contact heating method may include, in particular, a thermal pressure fixation, a heat-roll fixation, a pressure-heating fixation in which fixation is performed by a pivoting pressure member containing a heater fixed inside thereof, and the like.

The embodiments of the present invention have been explained above, but the present invention is not limited to the embodiments described above, and various modifications may be added.

EXAMPLE

Typical Examples of the present invention are shown below, and the present invention is explained in more detailed. The present invention, of course, is not limited to Examples. In Examples, unless otherwise specifically noted, "parts" refers to "parts by mass," and "%" refers to "% by weight."

<Measurement Method>

(Endothermic Peak Temperature (Tm1) and Amount of Endothermic Heat ($\Delta H1$ and $\Delta H2$) Derived from Hybrid Crystalline Polyester Resin)

The endothermic peak temperature (Tm1) and the amount of endothermic heat ($\Delta H1$ and $\Delta H2$) were obtained by performing a differential scanning calorimetry of a toner. In the differential scanning calorimetry, a differential scanning calorimeter "Diamond DSC" (manufactured by PerkinElmer Co., Ltd.) was used. The measurement was performed in measurement conditions (temperature-rising and cooling conditions), that is, the first heating process in which a temperature was risen from room temperature (25° C.) to 150° C. at a temperature rising speed of 10° C./minute, and the temperature was kept at 150° C. for 5 minutes was performed; then a cooling process in which the temperature was decreased from 150° C. to 0° C. at a cooling speed of 10° C./minutes, and the temperature was kept at 0° C. for 5 minutes is performed, and the second heating process in which the temperature was risen from 0° C. to 150° C. at a temperature rising speed of 10° C./minutes was performed in this order. In the measurement, 3.0 mg of a toner was sealed in an aluminum pan, and it was set in a sample holder in the differential scanning calorimeter "Diamond DSC." As a reference, an empty aluminum pan was used.

In the measurement, the amount of endothermic heat based on a melt peak (an endothermic peak whose half-value width is 15° C. or less) derived from a hybrid crystalline polyester resin in the first heating process was defined as $\Delta H1$ (J/g), and the amount of endothermic heat based on a melt peak derived from the hybrid crystalline polyester resin in the second heating process was defined as $\Delta H2$ (J/g). In the measurement, an analysis was performed from a heat absorption curve obtained in the first heating process, and the top temperature of the endothermic peak (an endothermic peak whose half-value width is 15° C. or less) derived from the hybrid crystalline polyester resin was defined as Tm1 (° C.).

(Melting Point (Tc) and Glass Transition Temperature (Tg) of Each Resin)

The melting point and the glass transition temperature of each resin forming the toner were obtained by performing a differential scanning calorimetry of each resin. The same differential scanning calorimetry as above was used. The measurement was performed in the same measurement conditions (temperature-rising and cooling conditions) as described above. In the measurement 3.0 mg of each resin was sealed in an aluminum pan, and it was set in a sample holder in the differential scanning calorimeter "Diamond DSC". As a reference, an empty aluminum pan was used.

In the measurement, the top temperature of a melt peak (an endothermic peak whose half-value width is 15° C. or less) of the resin in the first heating process was defined as a melting point (Tc) of the resin. As for the amorphous resin, in the measurement, an onset temperature obtained from a heat absorption curve in the first heating process was defined as a glass transition temperature Tg1 (° C.), and an onset temperature obtained from the second heating process was defined as a glass transition temperature Tg2 (° C.).

(Measurement of Weight Average Molecular Weight (Mw))

A weight average molecular weight (Mw) of each resin (in the terms of polystyrene) was obtained using "HLC-8220" (manufactured by Tosoh Corporation) as a GPC apparatus, and "TSK guard column+TSK gel Super HZM-M three-tiered" (manufactures by Tosoh Corporation) as a column. While the column temperature is maintained at 40° C., tetrahydrofuran (THF) as a carrier solvent was poured at a flow rate of 0.2 ml/minute. A sample to be measured was dissolved in tetrahydrofuran in a concentration of 1 mg/ml in a dissolution condition in which the sample was treated at room temperature for 5 minutes using an ultrasonic disperser, and then the solution was treated with a membrane filter having a pore size of 0.2 μm to obtain a sample solution. Into the apparatus was injected poured 10 μL of the sample solution together with the carrier solvent, the detection was performed using a refractive index detector (RI detector), and the molecular weight distribution of the measurement sample was calculated using a calibration curve, measured using a monodispersed polystyrene standard particles. As the standard polystyrene sample for the measurement of the calibration curve, samples having a molecular weight of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$, or $4.48 \times 10^6$, manufactured by Pressure Chemical Company, were used. At least about 10 standard polystyrene samples were measured, and a calibration curve was made therefrom. As the detector, a refractive index detector was used.

(Average Particle Size of Resin Particles, Colorant Particles, and the Like)

A volume average particle size (median diameter based on the volume) of the resin particles, the colorant particles, or the like was measured using "UPA-150" (manufactured by Micro Track Co., Ltd.).

(Observation Using TEM)

A fine structure of the binder resin forming the toner particles was observed using a transmission electron microscope (TEM) as follows:

First, the toner particles were thoroughly dispersed in a room temperature-curable epoxy resin, and the particles were embedded therein. The resulting particles were dispersed in styrene fine powder having a particle size of about 100 nm, which was pressure-molded to produce a block containing the toner. Subsequently, the produced block was subjected to a dyeing treatment with osmium tetraoxide if necessary, and then the block was cut into thin slices having a thickness of 80 to 200 nm with a microtome provided with a diamond knife to make a sample for measurement.

Next, the thin sample for measurement was set on the transmission electron microscope (TEM), and a picture of a cross-sectional structure of the toner was taken. The magnification of an electron microscope was set at 5000.

Production of Toner Particles

Production Example 1: Preparation of Dispersion Liquid Containing Release Agent Particles (W)

A solution containing 60 parts by mass of behenyl behenate (a melting point: 73° C.) as a release agent, 5 parts by mass of an ionic surfactant "NEOGEN RK" (manufactured by DKS Co., Ltd.), and 240 parts by mass of deionized water was heated to 95° C., and the mixture was thoroughly dispersed using a homogenizer "ULTRA-TURRAXT50" (manufactured by IKA Company). After that, the dispersion treatment was conducted using a pressure discharging type Golin homogenizer to prepare dispersion liquid containing the release agent particles (W), having a solid content of 20% by mass. The particles in the dispersion liquid containing the release agent particles had a volume average particle size of 240 nm.

Synthetic Example 1: Synthesis of Hybrid Crystalline Polyester Resin (c1)

Starting monomers of an addition polymerization resin (styrene-acrylic resin: StAc) unit described below, containing an amphoterically reactive monomer, and a radical polymerization initiator were put in a dropping funnel.

| | |
|---|---|
| Styrene | 34 parts by mass |
| n-Butyl Acrylate | 12 parts by mass |
| Acrylic Acid | 2 parts by mass |
| Polymerization Initiator (Di-t-Butyl Peroxide) | 7 parts by mass |

Starting monomers of a polycondensation resin (cystalline polyester resin: CPE) unit described below were put in a four-neck flask equipped with a nitrogen-introducing tube, a dewatering tube, a stirrer and a thermocouple, and the flask was heated to 170° C. to dissolve them.

| Sebacic Acid | 96 parts by mass |
|---|---|
| 1,12-Dodecanediol | 97 parts by mass |

Next, the starting monomers of the addition polymerization resin (StAc) were added dropwise over 90 minutes under stirring, and they were aged for 60 minutes. After that, unreacted monomers for the addition polymerization were removed under a reduced pressure (8 kPa). The amount of the monomers removed at that time was quite slight compared to the amount of the starting monomers for the resin.

After that, 0.3 parts by mass of Ti(OBu)$_4$ was added thereto as an esterification catalyst, and the temperature was raised to 235° C. The reaction was conducted in an ordinary pressure (101.3 kPa) for 5 hours followed by under a reduced pressure (8 kPa) for one hour.

Next, after the reaction system was cooled to 200° C., the reaction was conducted under a reduced pressure (20 kPa) for one hour to obtain a hybrid crystalline polyester resin (c1). The hybrid crystalline polyester resin (c1) contained units of a resin other than the CPEs (StAc unit) in a content of 20% by mass based on the total amount, and had a structure in which CPEs is grafted to StAc. The hybrid crystalline polyester resin (c1) had a weight average molecular weight (Mw) of 14,000, and a melting point (Tc) of 76° C.

Synthetic Examples 2 to 6: Synthesis of Hybrid Crystalline Polyester Resins (c2) to (c6)

Each of hybrid crystalline polyester resins (c2) to (c6) was obtained in the same manner as in Synthetic Example 1 except that the kind and the addition amount of the starting monomers of a polycondensation resin (CPEs) were changed to those described below. At that time, the composition ratio and the addition amount of the starting monomers of the addition polymerization resin (StAc) were the same as those in Synthetic Example 1. The weight average molecular weight (Mw) of each of the hybrid crystalline polyester resins (c2) to (c6) is shown in Table 1-1.

<<Hybrid Crystalline Polyester Resin (c2)>>

| Dodecane Diacid | 114 parts by mass |
|---|---|
| 1,9-Nonanediol | 79 parts by mass |

<<Hybrid Crystalline Polyester Resin (c3)>>

| Adipic Acid | 107 parts by mass |
|---|---|
| 1,6-Hexanediol | 86 parts by mass |

<<Hybrid Crystalline Polyester Resin (c4)>>

| Dodecane Diacid | 103 parts by mass |
|---|---|
| 1,12-Dodecanediol | 91 parts by mass |

<<Hybrid Crystalline Polyester Resin (c5)>>

| Sebacic Acid | 108 parts by mass |
|---|---|
| 1,9-Nonanediol | 86 parts by mass |

<<Hybrid Crystalline Polyester Resin (c6)>>

| Sebacic Acid | 104 parts by mass |
|---|---|
| 1,10-Decanediol | 90 parts by mass |

Synthetic Examples 7 to 10: Synthesis of Hybrid Crystalline Polyester Resins (c7) to (c10)

Each of hybrid crystalline polyester resins (c7) to (c10) was obtained in the same manner as in Synthetic Example 1 except that the addition amounts of the starting monomers of the polycondensation resin (CPEs) were changed so that the content ratio of the addition polymerization resin (StAc) units in the hybrid crystalline polyester resin was that described in Table 1-1. At that time, the composition ratio of the starting monomers of the addition polymerization resin (StAc), the addition amounts of the starting monomers, and the composition ratio of the starting monomer of the polycondensation resin (CPEs) were the same as those in Synthetic Example 1. The weight average molecular weight (Mw) of each of the hybrid crystalline polyester resins (c7) to (c10) is shown in Table 1-1.

Synthetic Examples 11 to 13: Synthesis of Hybrid Crystalline Polyester Resins (c11) to (c13)

Each of hybrid crystalline polyester resins (c11) to (c13) was obtained in the same manner as in Synthetic Example 1 except that the kinds and addition amounts of the starting monomers of the polycondensation resin (CPEs) were changed those described below. At that time, the composition ratio of the starting monomers of the addition polymerization resin (StAc) and the addition amounts of the starting monomers were the same as those in Synthetic Example 1. The weight average molecular weight (Mw) of each of the hybrid crystalline polyester resins (c11) to (c13) is shown in Table 1-1.

<<Hybrid Crystalline Polyester Resin (c11)>>

| Tetradecane Diacid | 108 parts by mass |
|---|---|
| 1,12-Dodecanediol | 85 parts by mass |

<<Hybrid Crystalline Polyester Resin (c12)>>

| Succinic Acid | 96 parts by mass |
|---|---|
| 1,6-Hexanediol | 97 parts by mass |

<<Hybrid Crystalline Polyester Resin (c13)>>

| Adipic Acid | 119 parts by mass |
|---|---|
| 1,4-Butanediol | 74 parts by mass |

Synthetic Example 14: Synthesis of Hybrid Crystalline Polyester Resin (c14)

Preparation of Amino-Modified Polyester Resin (1)

To a reaction vessel equipped with a condenser, a stirrer and a nitrogen-introducing tube were added 229 parts of a bisphenol A ethylene oxide 2-mole adduct, 529 parts of a bisphenol A propylene oxide 3-mole adduct, 208 parts of terephthalic acid, 46 parts of adipic acid, and 2 parts of dibutyl tin oxide. The mixture was reacted at 230° C. in an ordinary pressure for 8 hours, followed by under a reduced pressure of 10 to 15 mmHg for 5 hours. After that, 44 parts of trimellitic anhydride was added to the reaction vessel. The reaction was conducted at 180° C. in an ordinary pressure for 2 hours to obtain a polyester resin (1).

To a reaction vessel equipped with a starring bar and a thermometer were added 170 parts of isophorone diamine and 150 parts of methyl ethyl ketone, and the mixture was reacted at 50° C. for 5 hours to obtain a ketimine compound (1). The ketimine compound (1) had an amine value of 418.

Next, to a reaction vessel equipped with a condenser, a stirrer, and a nitrogen-introducing tube were added 60 parts by mass of the polyester resin (1) and 3 parts by mass of the ketimine compound (1), obtained above, and 500 parts by mass of ethyl acetate, which was heated to 45° C. to uniformly dissolve them. Next, the reaction was conducted at 45° C. for 4 hours and the solvent was removed therefrom at 30° C. for 8 hours to obtain an amino-modified polyester resin (1).

Preparation of Isocyanate-Modified Polyester Resin (1)

To a reaction vessel equipped with a condenser, a stirrer, and a nitrogen-introducing tube were added 682 parts of bisphenol A ethylene oxide 2-mole adduct, 81 parts of bisphenol A propylene oxide 2-mole adduct, 283 parts of terephthalic acid, 22 parts of trimellitic anhydride, and 2 parts of dibutyl tin oxide. They were reacted at 230° C. in an ordinary pressure for 8 hours, followed by under a reduced pressure of 10 to 15 mmHg for 5 hours to obtain a polyester resin (2). To a reaction vessel equipped with a condenser, a stirrer and a nitrogen-introducing tube were added the 410 parts of polyester resin (2), obtained above, 89 parts of isophorone diisocyanate and 500 parts of ethyl acetate, and the mixture was reacted at 100° C. for 5 hours to obtain an isocyanate-modified polyester resin (1). The isocyanate-modified polyester resin (1) had a free isocyanate content of 1.53% by weight.

[Preparation of Polyurea Resin (1)]

Next, to a vessel were added 25 parts by mass of the amino-modified polyester resin (1), 60 parts by mass of the isocyanate modified polyester resin (1), and 500 parts by mass of ethyl acetate, and the mixture was stirred to obtain a uniform solution. The reaction was conducted in the solution at 45° C. for 4 hours, and the solvent was removed therefrom at 30° C. for 8 hours to obtain a polyurea resin (1) for forming a main chain of the hybrid resin.

[Preparation of Crystalline Polyester Resin (1)]

Next, to a reaction vessel equipped with a condenser, a stirrer and a nitrogen-introducing tube were added 96 parts by mass of sebacic acid and 97 parts by mass of 1,12-dodecanediol, and 0.5 parts by mass of dibutyl tin oxide, and the mixture was reacted at 230° C. in an ordinary pressure for 8 hours, followed by under a reduced pressure of 10 to 15 mmHg for 5 hours to obtain a crystalline polyester resin (1).

<Synthesis of Hybrid Crystalline Polyester Resin (c14)>

Next, to a reaction vessel equipped with a condenser, a stirrer, and a nitrogen-introducing tube were added 160 parts by mass of the crystalline polyester resin (1) and 40 parts by mass of the polyurea resin (1), obtained as above, and 0.1 of Ti(OBu)$_4$ as an esterification catalyst. They were heated to 235° C., and the reaction was conducted in an ordinary pressure (101.3 kPa) for 5 hours, followed by under a reduced pressure (8 kPa) for one hour.

Next, the reaction mixture was cooled to 200° C., and then the reaction was conducted under a reduced pressure (20 kPa) for one hour to obtain a hybrid crystalline polyester resin (c14). The hybrid crystalline polyester resin (c14) contained units of a resin other than CPEs (polyurea) in a content of 20% by mass based on the total amount, and had a structure in which CPEs is grafted to the polyurea. The hybrid crystalline polyester resin (c14) had a weight average molecular weight (Mw) of 13,500, and a melting point (Tc) of 76° C.

Synthetic Example 15: Synthesis of Hybrid Crystalline Polyester Resin (c15)

Starting monomers of an addition polymerization resin (styrene-acrylic resin: StAc) unit described below, containing an amphoterically reactive monomer, and a radical polymerization initiator were put in a dropping funnel.

| | |
|---|---|
| Styrene | 34 parts by mass |
| n-Butyl Acrylate | 12 parts by mass |
| Acrylic Acid | 2 parts by mass |
| Polymerization Initiator (di-t-Butyl Peroxide) | 7 parts by mass |

Next, the starting monomers of the addition polymerization resin (StAc) were added dropwise over 90 minutes under stirring, and they were aged for 60 minutes. After that, unreacted monomers for the addition polymerization were removed under a reduced pressure (8 kPa) to obtain a vinyl resin (1). The amount of the monomers removed at that time was quite slight compared to the amount of the starting monomers for the resin.

Next, 275 parts by mass of sebacic acid and 277 parts by mass of dodecanediol were put in a reaction vessel equipped with a stirrer, a thermometer, a condenser, and a nitrogen gas-introducing tube. After a space inside the reaction vessel was substituted by dry nitrogen gas, 0.1 parts by mass of Ti(OBu)$_4$ was added thereto, and the reaction was conducted at about 180° C. for 8 hours under a nitrogen gas stream. To the reaction system was further added 0.2 parts by mass of Ti(OBu)$_4$ and the temperature was raised to about 220° C., and the reaction was conducted for 6 hours under stirring. After that, a pressure inside the reaction vessel was decreased to 10 mmHg, and the reaction was conducted under the reduced pressure to obtain a crystalline polyester resin (2).

The vinyl resin (1) and the crystalline polyester resin (2) were block-copolymerized in a procedure described below.

First, a glass vessel equipped with a reflux condenser, a nitrogen-introducing tube, and a stirrer were added 92 parts by mass of the crystalline polyester resin (2) and 8 parts by mass of the vinyl resin (1), and they were stirred at 50° C. to dissolve them. After that, 2.7 parts by mass of dicyclo-carbodiimide (DCC) and 0.17 parts by mass of dimethyl-aminopyridine (DMAP) were added thereto, and the reaction was conducted at 50° C. for 2 hours to obtain a hybrid crystalline polyester resin (c15), which is a block-copolymer of the vinyl resin and the crystalline polyester resin. The hybrid crystalline polyester resin (c15) had a weight average molecular weight (Mw) of 15,000, and a melting point (Tc) of 76° C.

Synthetic Example 16: Synthesis of Hybrid Crystalline Polyester Resin (c16)

Starting monomers of a polycondensation resin (crystalline polyester resin: CPEs) unit described below, containing an amphoterically reactive monomer, were put in a four-neck flask equipped with a nitrogen-introducing tube, a dewatering tube, a stirrer and a thermocouple, and the mixture was heated to 170° C. to dissolve them.

| Sebacic Acid | 275 parts by mass |
|---|---|
| 1,12-Dodecanediol | 277 parts by mass |
| Methylenesuccinic acid | 23 parts by mass |

After that, 0.8 parts by mass of Ti(OBu)$_4$ was added thereto as an esterification catalyst and the temperature was raised to 235° C., and the reaction was conducted in an ordinary pressure (101.3 kPa) for 5 hours, followed by under a reduced pressure (8 kPa) for one hour.

Next, starting monomers of the addition polymerization resin (styrene-acrylic resin: StAc) unit described below, and a radical polymerization initiator were put in a dropping funnel.

| Styrene | 107 parts by mass |
|---|---|
| n-Butyl Acrylate | 37 parts by mass |
| Polymerization Initiator (di-t-Butyl Peroxide) | 20 parts by mass |

Next, the starting monomers of the addition polymerization resin (StAc) were added dropwise over 90 minutes under stirring, and they were aged for 60 minutes. After that, unreacted monomers for the addition polymerization were removed under a reduced pressure (8 kPa). The amount of the monomers removed at that time was quite slight compared to the amount of the starting monomers for the resin.

Next, after the reaction mixture was cooled to 170° C., the reaction was conducted under a reduced pressure (20 kPa) for one hour to synthesize a hybrid crystalline polyester resin (c16) having a graft structure in which the crystalline polyester resin unit (CPEs) formed a trunk and the vinyl resin units (StAc) formed the branches. The hybrid crystalline polyester resin (c16) had a weight average molecular weight (Mw) of 15,000, and a melting point (Tc) of 76° C.

Synthetic Example 17: Synthesis of Crystalline Polyester Resin (c17)

In a reaction vessel equipped with a stirrer, a thermometer, a condenser, and nitrogen gas-introducing tube were put 875.1 parts by mass of azelaic acid, 450.5 parts by mass of 1,4-butanediol, and 40.7 parts by mass of fumaric acid. After space inside the reaction vessel was substituted by dry nitrogen gas, 2.5 parts by mass of dibutyltin was added thereto, and the temperature was raised to about 220° C. under a reduced pressure atmosphere. The reaction was conducted with stirring them for 6 hours to obtain a crystalline polyester resin (c17). The crystalline polyester resin (c17) had a weight average molecular weight (Mw) of 13,000, and a melting point (Tc) of 60° C.

Production Example 2: Preparation of Aqueous Dispersion Liquid (C1) Containing Hybrid Crystalline Polyester Resin Fine Particles In 200 parts by mass of ethyl acetate was dissolved 200 parts by mass of the hybrid crystalline polyester resin (c1) obtained in Synthetic Example 1. While the resulting solution was stirred, an aqueous solution in which polyoxyethylene lauryl ether sodium sulfate was dissolved in a concentration of 1% by mass in 800 parts by mass of deionized water was added dropwise slowly to the solution. After ethyl acetate was removed from the resulting solution under a reduced pressure, the pH thereof was adjusted to 8.5 with ammonia. After that, the solid concentration was adjusted to 30% by mass. Thus, aqueous dispersion liquid (C1) containing the hybrid crystalline polyester resin fine particles in which the fine particles of the hybrid crystalline polyester resin (c1) were dispersed in the aqueous medium. At that time, the particles containing in the dispersion liquid (C1) had a median diameter, based on the volume, of 205 nm.

Production Examples 3 to 17: Preparation of Aqueous Dispersion Liquids (C2) to (C16) Containing Hybrid Crystalline Polyester Resin Fine Particles Each aqueous dispersion liquid (C2) to (C16) containing hybrid crystalline polyester resin fine particles was prepared in the same manner as in Production Example 2 except that each of hybrid crystalline polyester resins (c2) to (c16) was used instead to the hybrid crystalline polyester resin (c1). At that time, the particles contained in each dispersion liquids (C2) to (C16) had a median diameter, based on the volume, within the range of 180 to 240 nm.

Production Example 18: Preparation of Aqueous Dispersion Liquid (C17) Containing Crystalline Polyester Resin Fine Particles Aqueous dispersion liquid (C17) containing crystalline polyester resin fine particles was prepared in the same manner as in Production Example 2 except that the crystalline polyester resin (c17), obtained in Synthetic Example 17, was used instead of the hybrid crystalline polyester resin (c1). At that time, the particles contained in the dispersion liquid (C17) had a median diameter, based on the volume, of 200 nm.

Production Example 19: Preparation of Aqueous Dispersion Liquid (X1) Containing Amorphous Resin Fine Particles <<First Stage Polymerization>>
To a 5 L-reaction vessel equipped with a stirring apparatus, a temperature sensor, a condenser, and a nitrogen-introducing apparatus were added 8 parts by mass of sodium dodecyl sulfate and 3000 parts by mass of deionized water, and then while the mixture was stirred at a stirring speed of 230 rpm in a nitrogen stream, the inside temperature of the vessel was raised to 80° C. After the temperature was raised, 10 parts by mass of potassium persulfate dissolved in 200 parts by mass of deionized water was added thereto, and the liquid temperature was adjusted to 80° C. again. A monomer mixture liquid containing the following components were added dropwise over one hours.

| Styrene | 480 parts by mass |
|---|---|
| n-Butyl Acrylate | 250 parts by mass |
| Methacrylic Acid | 68.0 parts by mass |

After that, the polymerization was conducted by heating and stirring mixture at 80° C. for 2 hour, thereby preparing dispersion liquid (x1) containing the resin fine particles.
<<Second Stage Polymerization>>
To 5 L-reaction vessel equipped with a stirring apparatus, a temperature sensor, a condenser, and a nitrogen-introducing apparatus was put a solution in which 7 parts by mass of polyoxyethylene (2) sodium dodecyl ether sulfate was dissolved in 3000 parts by mass of deionized water. After the solution was heated to 98° C., to the solution were added 260 parts by mass of dispersion liquid (x1) containing the resin fine particles, and a solution containing the following monomers and release agent, which were dissolved at 90° C.

| | |
|---|---|
| Styrene (St) | 284 parts by mass |
| n-Butyl Acrylate (BA) | 92 parts by mass |
| Methacrylic Acid (MAA) | 13 parts by mass |
| n-Octyl 3-Mercaptopropionate | 1.5 parts by mass |
| Release agent: Behenyl Behenate (melting point: 73° C.) | 190 parts by mass |

The mixture was mixed and dispersed for one hour using a mechanical disperser "CLEARMIX" (manufactured by M Technique Co., Ltd.), which had a circulating route, thereby preparing dispersion liquid containing emulsified particles (oil droplets).

Next, to the dispersion liquid was added an initiator solution in which 6 parts by mass of potassium persulfate was dissolved in 200 parts by mass of deionized water, and the polymerization was conducted by heating and stirring the reaction system at 84° C. over one hour, thereby preparing dispersion liquid (x1') containing the resin fine particles.

<<Third Stage Polymerization>>

To the dispersion liquid (x1') containing the resin fine particles was further added 400 parts by mass of deionized water, and the mixture was thoroughly mixed, to which a solution in which 11 parts by mass of potassium persulfate was dissolved in 400 parts by mass of deionized water was added. In a temperature condition of 82° C., a monomer mixture containing the following components was added dropwise over one hour.

| | |
|---|---|
| Styrene (St) | 350 parts by mass |
| n-Butyl Acrylate (BA) | 215 parts by mass |
| Acrylic Acid (AA) | 30 parts by mass |
| n-Octyl 3-Mercaptopropionate | 8 parts by mass |

After the dropwise addition was finished, the polymerization was conducted by heating and stirring the mixture over 2 hours, and the reaction mixture was cooled to 28° C., thereby preparing aqueous dispersion liquid (X1) containing the amorphous resin fine particles formed of the vinyl resin.

In the obtained aqueous dispersion liquid (X1) containing the amorphous resin fine particles, the amorphous resin fine particles had a median diameter based on the volume of 220 nm, a glass transition temperature (Tg1) of 55° C., and a weight average molecular weight (Mw) of 32,000.

Production Example 20: Preparation of Aqueous Dispersion Liquid (X2) Containing Amorphous Resin Fine Particles A polyurea resin (2) was obtained in the same manner as in Preparation of Polyurea resin (1) of Synthetic Example 14 except that the reaction time was changed from 4 hours to 8 hours. Further, an aqueous dispersion liquid (X2) containing the amorphous resin fine particles was prepared in the same manner as in Production Example 2 except that the polyurea resin (2) obtained above was used instead of the hybrid crystalline polyester resin (c1). At that time, the particles contained in the dispersion liquid (X2) had a median diameter based on the volume of 230 nm, a glass transition temperature (Tg1) of 58° C., and a weight average molecular weight (Mw) of 29,000.

Production Example 21: Preparation of Aqueous Dispersion Liquid (X3) Containing Amorphous Resin Fine Particles To a round-bottom flask equipped with a stirring apparatus, a nitrogen-introducing tube, a temperature sensor, and a rectifying column were added 5.0 parts by mass of ethylene oxide additive of bisphenol A (BPA-EO), 45.0 parts by mass of propylene oxide additive of bisphenol A (BPA-PO), 15.0 parts by mass of isophthalic acid, and 35.0 parts by mass of fumaric acid. The temperature of the flask was raised to 200° C. by using a mantle heater.

After that, nitrogen gas was introduced through a gas-introducing tube, and the mixture was stirred while the inside of the flask was kept in an inert gas atmosphere. After that, 0.05 parts by mass, based on 100 parts by mass of the starting material mixture, of dibutyltinoxide was added, and the mixture was reacted for a pre-determined time while the temperature thereof was kept at 200° C. to obtain an amorphous resin (x3).

The obtained amorphous resin (x3), which was in a molten state, was transferred to an emulsifier (Cavitoron CD1010, manufactured by Eurotec Co., Ltd.) at a speed of 100 g/minute. In an aqueous medium tank, which was separately prepared, was put dilute aqueous ammonia having a concentration of 0.40% in which reagent aqueous ammonia was diluted with deionized water, and the ammonia was transferred to the emulsifier at a speed of 0.1 litter/minute while it was heated at 120° C. using a heat exchanger, at the same time when the molten amorphous resin (x3) was transferred. In this condition, the emulsifier was run at a revolution speed of a rotor of 60 Hz and a pressure of 0.49 MPa (5 kg/cm$^2$), and, thus, aqueous dispersion liquid (X3) containing the amorphous resin fine particles was obtained. In the obtained aqueous dispersion liquid (X3) containing the amorphous resin fine particles, the amorphous resin fine particles had a median diameter based on the volume of 240 nm, a glass transition temperature (Tg1) of 63° C., and a weight average molecular weight (Mw) of 58,000.

Production Example 22: Preparation of Aqueous Dispersion Liquid (S1) Containing Amorphous Resin Fine Particles for Shell Starting monomers of an addition polymerization resin (styrene-acrylic resin: StAc) unit described below, containing an amphoterically reactive monomer, and a radical polymerization initiator were put in a dropping funnel.

| | |
|---|---|
| Styrene | 80 parts by mass |
| n-Butyl Acrylate | 20 parts by mass |
| Acrylic Acid | 10 parts by mass |
| Polymerization Initiator (di-t-Butyl Peroxide) | 16 parts by mass |

In addition, starting monomers of a polycondensation resin (amorphous polyester resin) unit were put in a four-neck flask equipped with a nitrogen-introducing tube, a dewatering tube, a stirrer and a thermocouple, and they were heated to 170° C. to dissolve them.

| | |
|---|---|
| Bisphenol A Propylene Oxide 2-mole Adduct | 285.7 parts by mass |
| Terephthalic acid | 66.9 parts by mass |
| Fumaric Acid | 47.4 parts by mass |

Next, the starting monomers of the addition polymerization resin (StAc) were added dropwise over 90 minutes under stirring, and they were aged for 60 minutes. After that, unreacted monomers for the addition polymerization were removed under a reduced pressure (8 kPa), and then 0.4 parts by mass of Ti(OBu)$_4$ was added as an esterification catalyst. The temperature was raised to 235° C., and the reaction was conducted at an ordinary pressure (101.3 kPa) for 5 hours, followed by under a reduced pressure of (8 kPa) for one hour.

Next, after the reaction system was cooled to 200° C., the reaction was conducted under a reduced pressure (20 kPa) until the softening point reached a desired point. Then, the solvent was removed, thereby obtaining an amorphous resin (s1) for the shell. The obtained resin (s1) for the shell had a glass transition temperature (Tg) of 61° C., and a weight average molecular weight (Mw) of 19,000.

In 400 parts by mass of ethyl acetate (manufactured by Kanto Chemical Co., Ltd.) was dissolved 100 parts by mass of the obtained resin (s1) for the shell, which was mixed with 638 parts by mass of a solution of sodium lauryl sulfate having a concentration of 0.26% by mass, which had been previously prepared, and the mixture was subjected to an ultrasonic dispersion using a ultrasonic homogenizer "US-150T" (manufactured by NISSEI Corporation) at a V-LEVEL of 300 μA for 30 minutes while the mixture was stirred. After that, the ethyl acetate was completely removed from the reaction mixture under a reduced pressure for 3 hour in a heated state of 40° C. using a diaphragm vacuum pump "V-700" (manufactured by BUCHI Com.), while the reaction mixture was stirred, thereby preparing aqueous dispersion liquid (S1) containing the amorphous resin fine particles for the shell, having a solid content of 13.5% by mass. At that time, the particles contained in the dispersion liquid (S1) had a median diameter based on the volume of 160 nm.

Production Example 23: Preparation of Aqueous Dispersion Liquid (Cy1) Containing Colorant Particles To 1600 parts by mass of deionized water was added 90 parts by mass of sodium dodecyl sulfate. While the solution was stirred, 420 parts by mass of copper phthalocyanine (C. I. Pigment Blue 15:3) was gradually added thereto, and then the mixture was subjected to a dispersion treatment using a stirring apparatus "CLEARMIX" (manufactured by M Technique Co., Ltd.), thereby preparing aqueous dispersion liquid (Cy1) containing the colorant particles.

In the obtained aqueous dispersion liquid (Cy1) containing the colorant particles, the colorant particles had a median diameter based on the volume of 110 nm.

Example 1: Production of Cyan Toner (1)

To a reaction vessel equipped with a stirring apparatus, a temperature sensor, and a condenser were added 279.5 parts by mass (in terms of solid content) of the aqueous dispersion liquid (X1) containing the amorphous resin fine particles, 43 parts by mass (in terms of solid content) of the aqueous dispersion liquid (C1) containing the hybrid crystalline polyester resin fine particles, and 2000 parts by mass of deionized water, and then the pH of the mixture was adjusted to 10 by adding a 5 mole/litter of aqueous sodium hydroxide solution.

After that, 30 parts by mass (in terms of solid content) of the aqueous dispersion liquid (Cy1) containing the colorant particles was added, and then an aqueous solution containing 60 parts by mass of magnesium chloride dissolved in 60 parts by mass of deionized water was added thereto at 30° C. over 10 minutes under stirring. After that, the mixture was allowed to stand for 3 minutes, and then the temperature-rising is initiated. The temperature of the system was raised to 80° C. over 60 minutes, and the particle growth reaction was continued while the temperature was kept at 80° C. While this condition was kept, a particle size of the aggregated particles was measured using "Coulter multiple sizer 3" (manufactured by Beckman Coulter Inc.). At the time when the median diameter based on the volume reached 6.0 μm, 107.5 parts by mass (in terms of solid content) of the aqueous dispersion liquid (S1) containing the amorphous resin fine particles for the shell was added over 30 minutes, and at the time when the supernatant of the reaction liquid became clear, an aqueous solution containing 190 parts by mass of sodium chloride dissolved in 760 parts by mass of deionized water was added to stop the particle growth. Then, the temperature was further raised, and the system was heated and stirred at 90° C. to advance the fusion of particles. At the time when the average circularity of the toner base particles reached 0.945, the reaction mixture was cooled to 30° C. at a cooling speed of 2.5° C./minute. The average circularity was measured using a measurement apparatus "FPIA-2100" (Sysmex Corporation) (the number of HPFs detection: 4000).

Next, the solid-liquid separation was conducted, and an operation in which the dehydrated toner cake was re-dispersed in deionized water, and then the solid-liquid separation was conducted was repeated three times, thereby the resulting product was washed, and then it was dried at 40° C. for 24 hours to obtain toner particles (1).

To 100 parts by mass of the obtained toner particles (1) were added 0.6 parts by mass of hydrophobic silica (number average primary particle size=12 nm, hydrophobicity=68) and 1.0 part by mass of hydrophobic titanium oxide (number average primary particle size=20 nm, hydrophobicity=63), which was mixed using a "Henschel mixer" (manufactured by Mitsui Miike Machinery Co., Ltd.) at a circumferential speed of blades of 35 mm/second at 32° C. for 20 minutes. After that, coarse particles were removed through a sieve having an opening of 45 μm. Thus, an external additive treatment was conducted to obtain cyan toner (1) having a volume average particle size of 6.2 μm. Tm1, ΔH1 and ΔH2 of the obtained cyan toner (1) were measured as described above. The results are shown in Table 1-2. Tm1 of the cyan toner (1), according to the differential scanning calorimetry, was almost the same as the melting point (Tc) of the hybrid crystalline polyester resin (c1) forming the toner particles (1), and this tendency was observed in toner particles from Examples and Comparative Examples described below. When the fine structure of the binder resin forming the toner particles was observed in the method described above (observation according to TEM), a sea-island structure in which the hybrid crystalline polyester resin formed dispersion phases (domains) and the amorphous resin formed a continuous phase (matrix) was confirmed.

Examples 2 to 11: Production of Cyan Toner (2) to (11)

Each cyan toner (2) to (11) was produced in the same manner as in Example 1 except that each of the aqueous dispersion liquids (C2) to (C11) containing the hybrid crystalline polyester resin fine particles was used instead of the aqueous dispersion liquid (C1) containing the hybrid crystalline polyester resin fine particles. Tm1, ΔH1 and ΔH2 of the obtained each cyan toner (2) to (11) were measured as described above. The results are shown in Table 1-2. When the observation according to TEM was conducted as described above, a sea-island structure, which was the same as observed in Example 1, was confirmed. Each of the cyan toner (2) to (11) had a volume average particle size within the range of 6.0 to 6.5 μm.

Examples 12 to 15: Production of Cyan Toner (12) to (15)

Each cyan toner (12) to (15) was produced in the same manner as in Example 1 except that the addition amount of each dispersion liquid was changed so that the contents of the hybrid crystalline polyester resin, the amorphous resin and the resin for the shell in the binder resin were those described in Table 1-1. Tm1, ΔH1 and ΔH2 of the obtained each cyan toner (12) to (15) were measured as described above. The results are shown in Table 1-2. When the observation according to TEM was conducted as described above, a sea-island structure, which was the same as observed in Example 1, was confirmed. Each of the cyan toner (12) to (15) had a volume average particle size within the range of 6.0 to 6.5 μm.

Example 16: Production of Cyan Toner (16)

To a reaction vessel equipped with a stirring apparatus, a temperature sensor and a condenser were added 387 parts by mass (in terms of solid content) of the aqueous dispersion liquid (S1) containing the amorphous resin fine particles for the shell, 43 parts by mass (in terms of solid content) of the aqueous dispersion liquid (C1) containing the hybrid crystalline polyester resin fine particles, and 2000 parts by mass of deionized water, and then a 5 moles/liter of aqueous sodium hydroxide solution was added thereto to adjust the pH thereof to 10. In this Example, the amorphous resin for the shell was used as the amorphous resin forming the toner particles.

After that, 30 parts by mass (in terms of solid content) of the aqueous dispersion liquid (Cy1) containing the colorant particles, and the 43 parts by mass (in terms of solid content) of the dispersion liquid (W) containing the release agent particles were added. Then, an aqueous solution containing 60 parts by mass of magnesium chloride dissolved in 60 parts by mass of deionized water was added at 30° C. over 10 minutes under stirring. After that, the mixture was allowed to stand for 3 minutes, and then the temperature-rising is initiated. The temperature of the system was raised to 80° C. over 60 minutes, and the particle growth reaction was continued while the temperature was kept at 80° C. While this condition was kept, a particle size of the aggregated particles was measured using "Coulter multiple sizer 3" (manufactured by Beckman Coulter Inc.). At the time when the median diameter based on the volume reached 6.5 μm, an aqueous solution containing 190 parts by mass of sodium chloride dissolved in 760 parts by mass of deionized water was added to stop the particle growth. Then, the temperature was further raised, and the system was heated and stirred at 90° C. to advance the fusion of particles. At the time when the average circularity of the toner base particles reached 0.945, the reaction mixture was cooled to 30° C. at a cooling speed of 2.5° C./minute. The average circularity was measured using a measurement apparatus "FPIA-2100" (Sysmex Corporation) (the number of HPFs detection: 4000).

Next, the solid-liquid separation was conducted, and an operation in which the dehydrated toner cake was re-dispersed in deionized water, and then the solid-liquid separation was conducted was repeated three times, thereby the resulting product was washed, and then it was dried at 40° C. for 24 hours to obtain toner particles (16).

Next, the external additive treatment was conducted in the same manner as in Example 1 to obtain a cyan toner (16) having a volume average particle size of 6.3 μm. Tm1, ΔH1 and ΔH2 of the obtained cyan toner (16) were measured as described above. The results are shown in Table 1-2. When the fine structure of the binder resin forming the toner particles was observed in the method described above (observation according to TEM), a sea-island structure in which the hybrid crystalline polyester resin formed dispersion phases (domains) and the amorphous resin for the shell formed a continuous phase (matrix) was confirmed. Although the toner particles in this Example do not have the core-shell structure, it is described as the "amorphous resin for the shell" in order to show the kind of the resin.

Example 17: Production of Cyan Toner (17)

A cyan toner (17) was produced in the same manner as in Example 1 except that aqueous dispersion liquid (C14) containing the hybrid crystalline polyester resin fine particles was used instead of the aqueous dispersion liquid (C1) containing the hybrid crystalline polyester resin fine particles. Tm1, ΔH1 and ΔH2 of the obtained cyan toner (17) were measured as described above. The results are shown in Table 1-2. When the observation according to TEM was conducted as described above, the sea-island structure, which was the same as observed in Example 1 was confirmed. The cyan toner (17) had a volume average particle size of 6.3 μm.

Comparative Examples 1 to 4: Production of Comparative Cyan Toner (1) to (4)

Each of comparative cyan toner (1) to (4) was produced in the same manner as in Example 1 except that the aqueous dispersion liquids (C12), (C13), (C15) and (C16) containing the hybrid crystalline polyester resin fine particles were respectively used instead of the aqueous dispersion liquid (C1) containing the hybrid crystalline polyester resin fine particles. Tm1, ΔH1 and ΔH2 of the obtained each comparative cyan toner (1) to (4) were measured as described above. The results are shown in Table 1-2.

Comparative Example 5: Production of Comparative Cyan Toner (5)

A comparative cyan toner (5) was produced in the same manner as in Example 1 except that the aqueous dispersion liquid (C17) containing the crystalline polyester resin fine particles was used instead of the aqueous dispersion liquid (C1) containing the hybrid crystalline polyester resin fine particles. Tm1, ΔH1 and ΔH2 of the obtained comparative cyan toner (5) were measured as described above. The results are shown in Table 1-2.

<Preparation of Developer>

Each of developers (1) to (17) and comparative developers (1) to (5) was produced by adding a ferrite carrier coated with a silicone resin and having a volume average particle size of 60 μm to each of the cyan toners (1) to (17) and the comparative cyan toners (1) to (5) in a toner particle concentration of 6% by mass, and mixing them.

<Evaluation Method>

(Low Temperature Fixability)

Each of the developers (1) to (17) and comparative developers (1) to (5) was put in a commercially available composite printer, a full color copying machine "Bizhub PRO C6501" (manufactured by Konica Minolta, Inc.) in which a fixing apparatus thereof was modified so that a surface temperature of a heating roller for fixation could be altered within the range of 100 to 210° C. A fixation experiment in which a solid image having a toner deposit amount of 11 mg/10 cm² was fixed on a OK embossed cloth paper (basis weight: 104.7 g/m²), manufactured by Oji Paper Co., Ltd., was repeatedly performed at fixation temperatures from 90° C. up to 130° C. at an interval of 5° C.

Next, the obtained printed paper obtained at each fixation temperature in the fixation experiment was folded so that a load was applied to the solid image using a folding machine, against which 0.35 MPa of compressed air was blown, and the folded part was ranked into 5 stages according to evaluation criteria shown below. The fixation temperature in the fixation experiment whose fixation temperature was the lowest among the fixation experiments ranked in 3 was defined as the lower limit temperature, and the evaluation was made. The results are shown in Table 1-2.

As the lower limit fixation temperature is lower, the low temperature fixability is better, and when the lower limit fixation temperature was 120° C., it was judged that the toner had no practical problem and was acceptable.

<<Evaluation Criteria>>

Rank 5: Completely no folded part
Rank 4: There are partly separations along the folded part.
Rank 3: There are fine linear separations along the folded part.
Rank 2: There are thin linear separations along the folded part.
Rank 1: There are large separations.

(Image Storability: Document Offset Resistance)

A special finisher FS-608 (manufactured by Konia Minolta Business Technology Co., Ltd.) was mounted on a commercially available full color copying machine "C6550" (manufactured by Konia Minolta Business Technology Co., Ltd.), and an automatic bookbinding test of 20 parts of saddle stitching printing (5 papers per copy) was repeated 50 times. A pixel rate per page was set at 50%. Evaluation was made using a transfer paper having a basis weight of 64 g. The printed paper was subjected to natural cooling until the temperature thereof reached room temperature. All of the pages were turned with one hand and whether or not there was adhesion between the images was confirmed. In the evaluation criteria, it is judged that "a" to "c" are acceptable.

<<Evaluation Criteria>> a: No adhesion is observed between the images, and there is no feeling of wrongness when the pages were turned.

b: Although a slight friction feeling is felt when the overlapped pages were turned, there is no adhesion between the images.

c: There is adhesion between the images when the overlapped pages are turned, and gloss unevenness is observed in some parts of the images as a trace of the adhesion between the image.

d: There is a missing image such as a void in the image part, the image clearly moves in the non-image part, and the document offset resistance is very poor.

(Evaluation of Heat-Resistant Storage Property)

In a 10 ml-glass bottle having an inner diameter of 21 mm was put 0.5 g of the toner, and a lid was closed. Using a Tap Denser KYT-2000 (manufactured by Seishin Enterprise Co., Ltd.), the bottle was shaken 600 times at room temperature, and then it was allowed to stand at 55° C. in 35% RH for 2 hours in a state where the lid was taken off. Next, the toner was carefully put on a 48-mesh sieve (opening: 350 µm) so that the aggregated toner was not disintegrated, and it was set in a powder tester (manufactured by Hosokawa Micron Corporation). It was fixed with a pressing bar and a knobnut, and a vibration was applied thereto for 10 seconds at a vibration strength of 1 mm in the feeding width. After that, a percent (% by mass) of the toner amount leaving on the sieve was measured.

The toner aggregation percent was calculated according to the following formula:

Toner Aggregation Percent (%)=[Mass of Toner (g) Leaving on Sieve/0.5 (g)]×100

Evaluation of the heat-resistant storage property of the toner was made according to the criteria described below. In the evaluation criteria, it is judged that "a" to "c" are acceptable.

<<Evaluation Criteria>> a: A toner aggregation percent of less than 10% by mass (very good heat-resistant storage property of the toner)

b: A toner aggregation percent is 10% by mass or more and less than 15% by mass (good heat-resistant storage property of the toner)

c: A toner aggregation percent is 15% by mass or more and less than 20% by mass (a slightly poor heat-resistant storage property of the toner, but it can be used.)

d: A toner aggregation percent is 20% by mass or more (poor heat-resistant storage property of the toner, and it cannot be used.)

TABLE 1-1

| | | | | | | | Hybrid crystalline polyester resin | | | | | | |
|---|---|---|---|---|---|---|---|---|---|---|---|---|---|
| | | | | | | | | | Kind and amount ratio of binder resin | | | | |
| | | | | | | | Amount of resin units other than CPEs (% by mass) | | Core particle resin | | | | Shell phase resin (amorphous resin) |
| | | CPEs | | | | | | | Hybrid crystalline polyester resin | | Amorphous resin | | |
| | | | | |C (acid) − C (alcohol)| | | | Molecular weight Mw | | Amount (% by mass) | | Amount (% by mass) | | Amount (% by mass) |
| | Toner No. | Kind | C (acid) | C (alcohol) | | Form | | | Kind | | Kind | | Kind |
| Example 1 | 1 | c1 | 10 | 12 | 2 | CPEs is grafted to StAc | 20 | 14000 | C1 | 10 | X1 | 65 | S1 | 25 |
| Example 2 | 2 | c2 | 12 | 9 | 3 | | 20 | 13500 | C2 | 10 | X1 | 65 | S1 | 25 |
| Example 3 | 3 | c3 | 6 | 6 | 0 | | 20 | 14500 | C3 | 10 | X1 | 65 | S1 | 25 |
| Example 4 | 4 | c4 | 12 | 12 | 0 | | 20 | 15000 | C4 | 10 | X1 | 65 | S1 | 25 |
| Example 5 | 5 | c5 | 10 | 9 | 1 | | 20 | 14000 | C5 | 10 | X1 | 65 | S1 | 25 |
| Example 6 | 6 | c6 | 10 | 10 | 0 | | 20 | 14000 | C6 | 10 | X1 | 65 | S1 | 25 |
| Example 7 | 7 | c7 | 10 | 12 | 2 | | 30 | 15000 | C7 | 10 | X1 | 65 | S1 | 25 |
| Example 8 | 8 | c8 | 10 | 12 | 2 | | 10 | 14500 | C8 | 10 | X1 | 65 | S1 | 25 |
| Example 9 | 9 | c9 | 10 | 12 | 2 | | 8 | 14500 | C9 | 10 | X1 | 65 | S1 | 25 |
| Example 10 | 10 | c10 | 10 | 12 | 2 | | 32 | 13500 | C10 | 10 | X1 | 65 | S1 | 25 |
| Example 11 | 11 | c11 | 14 | 12 | 2 | | 20 | 14000 | C11 | 10 | X1 | 65 | S1 | 25 |
| Example 12 | 12 | c1 | 10 | 12 | 2 | | 20 | 14000 | C1 | 4 | X1 | 71 | S1 | 25 |

TABLE 1-1-continued

| | | | Hybrid crystalline polyester resin | | | | | Kind and amount ratio of binder resin | | | | |
| | | | | | | Amount of resin units other than CPEs (% by mass) | | Core particle resin | | | | Shell phase resin (amorphous resin) |
| | | | CPEs | | | | | Hybrid crystalline polyester resin | | Amorphous resin | | |
| | Toner No. | Kind | C (acid) | C (alcohol) | \|C (acid) − C (alcohol)\| | Form | | Molecular weight Mw | Kind | Amount (% by mass) | Kind | Amount (% by mass) | Kind | Amount (% by mass) |
|---|---|---|---|---|---|---|---|---|---|---|---|---|---|---|
| Example 13 | 13 | c1 | 10 | 12 | 2 | | 20 | 14000 | C1 | 31 | X1 | 44 | S1 | 25 |
| Example 14 | 14 | c1 | 10 | 12 | 2 | | 20 | 14000 | C1 | 6 | X1 | 69 | S1 | 25 |
| Example 15 | 15 | c1 | 10 | 12 | 2 | | 20 | 14000 | C1 | 29 | X1 | 46 | S1 | 25 |
| Example 16 | 16 | c1 | 10 | 12 | 2 | | 20 | 14000 | C1 | 10 | S1 | 90 | — | — |
| Example 17 | 17 | c14 | 10 | 12 | 2 | CPEs is grafted to polyurea. | 20 | 13500 | C14 | 10 | X2 | 65 | S1 | 25 |
| Comparative Example 1 | 18 | c12 | 4 | 6 | 2 | CPEs is grafted to StAc. | 20 | 14000 | C12 | 10 | X1 | 65 | S1 | 25 |
| Comparative Example 2 | 19 | c13 | 6 | 4 | 2 | | 20 | 14000 | C13 | 10 | X1 | 65 | S1 | 25 |
| Comparative Example 3 | 20 | c15 | 10 | 12 | 2 | StAc/CPEs Linear block-polymer | 20 | 15000 | C15 | 10 | X1 | 65 | S1 | 25 |
| Comparative Example 4 | 21 | c16 | 10 | 12 | 2 | StAc is grafted to CPEs. | 20 | 15000 | C16 | 10 | X1 | 65 | S1 | 25 |
| Comparative Example 5 | 22 | c17 | 9 | 4 | 5 | No modification | 0 | 13000 | C17 | 25 | X3 | 60 | X3 | 15 |

TABLE 1-2

| | | Thermal property | | Evaluation | | |
| | toner No. | Tm1 (° C.) | ΔH2/ΔH1 | Low temperature fixability (Embossed cloth paper) (° C.) | Image storability | Heat-resistant storage property |
|---|---|---|---|---|---|---|
| Example 1 | 1 | 76 | 0.80 | 100 | a | a |
| Example 2 | 2 | 68 | 0.95 | 115 | a | b |
| Example 3 | 3 | 55 | 0.16 | 95 | c | c |
| Example 4 | 4 | 76 | 0.90 | 110 | a | a |
| Example 5 | 5 | 65 | 0.50 | 95 | b | b |
| Example 6 | 6 | 70 | 0.70 | 100 | a | a |
| Example 7 | 7 | 76 | 0.71 | 100 | c | b |
| Example 8 | 8 | 76 | 0.83 | 110 | a | a |
| Example 9 | 9 | 76 | 0.85 | 120 | b | b |
| Example 10 | 10 | 76 | 0.69 | 105 | c | c |
| Example 11 | 11 | 80 | 0.95 | 120 | a | a |
| Example 12 | 12 | 76 | 0.68 | 115 | c | a |
| Example 13 | 13 | 76 | 0.91 | 100 | c | c |
| Example 14 | 14 | 76 | 0.70 | 105 | b | a |
| Example 15 | 15 | 76 | 0.88 | 100 | b | c |
| Example 16 | 16 | 76 | 0.80 | 110 | a | c |
| Example 17 | 17 | 76 | 0.80 | 110 | c | c |
| Comparative Example 1 | 18 | 83 | 0.96 | 130 | a | a |
| Comparative Example 2 | 19 | 53 | 0.14 | 95 | d | d |
| Comparative Example 3 | 20 | 76 | 0.71 | 130 | d | c |
| Comparative Example 4 | 21 | 76 | 0.74 | 130 | d | d |
| Comparative Example 5 | 22 | 60 | 0.78 | 125 | b | b |

From the results above, when the toner particles from Examples were used, the results in which the low temperature fixability (in particular, to uneven media) the image storability and the heat-resistant storage property are excellent and well-balanced could be obtained.

On the other hand, as to the form of the hybrid polyester resin, in the case of the form other than that of the present invention (i.e., the graft polymer having the amorphous resin as the main chain and CPEs as the side chains) was taken (Comparative Examples 3 to 5), the results of the decreased low temperature fixability were obtained. When the toner particles from Comparative Example 1 were used, though the form of the hybrid polyester resin was the same as that of the present invention, it could be considered that the excellent low temperature fixability could not be obtained because the compatibility was suppressed, and Tm1 was high. On the other hand, when the toner particles having a high compatibility like toner particles from Comparative Example 2 were used, though the low temperature fixability was good, the results of the decreased image storability and the decreased heat-resistant storage property were shown, and the various properties described above could not be improved in a well-balanced way.

What is claimed is:

1. A toner for electrostatic charge image development comprising:
    a binder resin, wherein
    the binder resin comprises
        a hybrid crystalline polyester resin in which a crystalline polyester resin unit and an amorphous resin unit other than a polyester resin are chemically bonded, and
        an amorphous resin, and
    the binder resin comprises a phase-separated structure in which the hybrid crystalline polyester resin forms a dispersion phase and the amorphous resin forms a continuous phase,
    the hybrid crystalline polyester resin is a graft-copolymer having a main chain formed of the amorphous resin unit other than a polyester resin and a side chain formed of the crystalline polyester resin unit, and the toner satisfies the relationships represented by the following formulas (1) and (2):

$$0.15 < \Delta H2/\Delta H1 \leq 0.95 \quad (1)$$

$$55 \leq Tm1 \leq 80 \quad (2)$$

wherein Tm1 (° C.) is the temperature derived from an endothermic peak of the hybrid crystalline polyester resin in the first heating process in a differential scanning calorimetry of the toner; $\Delta H1$ (J/g) is the amount of endothermic heat based on the endothermic peak; and $\Delta H2$ (J/g) is the amount of endothermic heat based on the endothermic peak in the second heating process.

2. The toner for electrostatic charge image development according to claim 1, wherein the $\Delta H1$ and the $\Delta H2$ satisfy the relationship represented by the following formula (3):

$$0.50 \leq \Delta H2/\Delta H1 \leq 0.90 \quad (3).$$

3. The toner for electrostatic charge image development according to claim 1, wherein the $\Delta H1$ and the $\Delta H2$ satisfy the relationship represented by the following formula (4):

$$0.70 \leq \Delta H2/\Delta H1 \leq 0.90 \quad (4).$$

4. The toner for electrostatic charge image development according to claim 1, wherein the amorphous resin unit other than a polyester resin is contained in a content of 10% by mass or more and less than 30% by mass relative to the total amount of the hybrid crystalline polyester resin.

5. The toner for electrostatic charge image development according to claim 1, wherein the amorphous resin unit other than a polyester resin is formed of the same resin as the amorphous resin.

6. The toner for electrostatic charge image development according to claim 1, wherein the hybrid crystalline polyester resin is contained in a content of 5% by mass or more and less than 30% by mass relative to the total amount of the binder resin.

7. The toner for electrostatic charge image development according to claim 1, wherein the amorphous resin contained in the binder resin is a vinyl resin.

8. The toner for electrostatic charge image development according to claim 1, wherein the amorphous resin unit other than a polyester resin is a vinyl resin unit.

* * * * *